US012786140B2

(12) United States Patent
De Castro Marchese et al.

(10) Patent No.: US 12,786,140 B2
(45) **Date of Patent: *Nov. 3, 2026**

(54) SYSTEMS AND METHODS FOR PROVIDING ON-DEMAND ACCESS TO RESOURCES ACROSS GLOBAL OR CLOUD COMPUTER NETWORKS USING ARTIFICIAL INTELLIGENCE MODELS

(71) Applicant: Citibank, N.A., New York, NY (US)

(72) Inventors: Joao Paulo De Castro Marchese, Miami, FL (US); Christopher Opeyemi Olomo, Dublin (IE); Leonardo Perenha Baccala, Miami, FL (US); Valeria Alejandra Sica, Miami, FL (US)

(73) Assignee: Citibank, N.A., New York, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 19/069,109

(22) Filed: Mar. 3, 2025

(65) Prior Publication Data

US 2025/0254134 A1 Aug. 7, 2025

Related U.S. Application Data

(63) Continuation of application No. 18/923,507, filed on Oct. 22, 2024, now Pat. No. 12,244,515, which is a continuation-in-part of application No. 18/434,687, filed on Feb. 6, 2024, now Pat. No. 12,126,546.

(51) Int. Cl.

| | |
|---|---|
| ***H04L 41/16*** | (2022.01) |
| ***H04L 47/70*** | (2022.01) |
| ***H04L 47/78*** | (2022.01) |

(52) U.S. Cl.

CPC ............ *H04L 47/822* (2013.01); *H04L 41/16* (2013.01); *H04L 47/781* (2013.01)

(58) Field of Classification Search

CPC ...... H04L 47/822; H04L 41/16; H04L 47/781
See application file for complete search history.

(56) References Cited

U.S. PATENT DOCUMENTS

| | | | | |
|---|---|---|---|---|
| 10,574,584 | B1 * | 2/2020 | Young | H04L 41/0273 |
| 12,169,792 | B2 * | 12/2024 | Vega | G05D 1/0289 |
| 2004/0082338 | A1 * | 4/2004 | Norrgard | H04L 43/00 370/328 |
| 2020/0372154 | A1 * | 11/2020 | Bacher | G06F 16/1824 |
| 2020/0374339 | A1 * | 11/2020 | Billore | G06F 9/4881 |
| 2021/0049455 | A1 * | 2/2021 | Kursun | G06F 18/213 |
| 2021/0194988 | A1 * | 6/2021 | Chaysinh | H04L 41/5025 |
| 2023/0071281 | A1 * | 3/2023 | Tariq | H04L 41/0897 |
| 2024/0078457 | A1 * | 3/2024 | Stockert | H04L 41/12 |
| 2024/0205163 | A1 * | 6/2024 | Smith | G06F 9/465 |
| 2024/0404687 | A1 * | 12/2024 | Bell | G06Q 10/06316 |
| 2024/0406166 | A1 * | 12/2024 | Bell | G06F 16/3329 |
| 2025/0254134 | A1 * | 8/2025 | De Castro Marchese | H04L 47/781 |

* cited by examiner

*Primary Examiner* — Aftab N. Khan
(74) *Attorney, Agent, or Firm* — Foley & Lardner LLP

(57) ABSTRACT

Systems and methods for providing on-demand access to resources across global or cloud computer networks are described herein. In particular, the systems and methods can use transformer models to estimate proxy resource capacities. These proxy resource capacities can be leveraged to satisfy certain conditions for executing blockchain actions, enabling resources to be used even when a current capacity of those resources does not satisfy the conditions.

19 Claims, 11 Drawing Sheets

SYSTEMS AND METHODS FOR PROVIDING ON-DEMAND ACCESS TO RESOURCES ACROSS GLOBAL OR CLOUD COMPUTER NETWORKS USING ARTIFICIAL INTELLIGENCE MODELS

CROSS-REFERENCE TO RELATED APPLICATIONS

This application is a continuation of U.S. patent application Ser. No. 18/923,507, filed Oct. 22, 2024, which is a continuation-in-part of U.S. patent application Ser. No. 18/434,687, filed Feb. 6, 2024. The content of the foregoing application is incorporated herein in its entirety by reference.

BACKGROUND

Cloud computing refers to the delivery of computing services over the internet (the cloud) to offer on-demand access to a variety of resources, including computing power, storage, databases, networking, and/or software, without direct management or control of the underlying infrastructure by the user. A key characteristic of cloud computing is that it allows for the quick and flexible scaling of resources up or down based on demand. To provide this rescaling, the devices in the cloud computing network must maintain connectivity to the network. If a device loses connectivity to the network, the device is no longer available or has a capacity for use as a network resource.

To mitigate disruptions resulting from the loss of one or more devices in the network, cloud providers often have redundant systems in place across multiple devices, data centers, and/or regions. If one device (or data center) experiences an outage, services can be rerouted to another device (or data center), ensuring continuity of service. This redundancy reduces the impact of random network outages. However, rerouting services and redundancies have their limits. In particular, the network must maintain a correct accounting of availability or capacities of other devices, data centers, and/or regions throughout the network. For example, information about what services are, or were, being provided by a resource must be constantly monitored to enable proper rerouting. As such, any disruption to one resource may not only effect services currently being performed on that resource but may also affect the services performed, or to be performed, by another resource.

SUMMARY

In view of the aforementioned technical problems, systems and methods are described herein for managing resources across a global and/or cloud network. In particular, systems and methods are described for mitigating issues related to providing services using unstable resources (e.g., resources that may be off-line or potentially go off-line). For example, the systems and methods may mitigate issues related to providing services despite instability in resources by monitoring tokenized capacity of a given resource using a decentralized blockchain network and performing actions based on that availability or capacity based on conditions specified within the code of action-specific self-executing programs themselves (as opposed to a centralized coordination device).

For example, monitoring the availability or capacity of a given resource and/or performing actions based on that availability or capacity presents several technical issues. First, different services may require different resources that may be described by different terminology and/or may generate usage data related to the different resources in different formats. Furthermore, the way an application uses a resource to perform a service, the availability or capacity required, and/or the attributes of that service may be specific to the application and/or resource. To overcome these technical issues, the system generates a tokenized representation of these respective availabilities or capacities, which standardizes and abstracts the underlying complexities of different formats and requirements. Using this tokenization, the system may monitor the availability or capacity of a given resource for use in a particular service in a standardized manner.

Unfortunately, tokenization alone does not overcome all the technical issues related to determining availability or capacity of a given resource and performing actions based on that availability or capacity. For example, to generate a proper tokenization of availability or capacity at various resources, the system needs to monitor each service and/or resource. However, if the device responsible for monitoring for availability or capacity goes off-line, the entire system may be threatened. To overcome this fundamental technical flaw, the system monitors availability or capacity using a log established through a series of self-executing programs across a decentralized blockchain network. For example, by using the decentralized blockchain network to maintain the log, the loss of any device (or data center) due to the device (or data center) going off-line will not threaten the system or impede its ability to monitor the availability or capacity of a given resource.

Similarly, to perform actions based on determined availability or capacity, the system needs a mechanism for coordinating those actions. However, if the device responsible for coordinating those actions goes off-line, the actions are not performed irrespective of availability or capacity. To overcome this additional technical flaw, the system uses a plurality of action-specific self-executing programs, as opposed to a centralized device or software application, to determine when to perform an action given the availability or capacity of a resource. For example, as opposed to a centralized device instructing an action to be performed based on availability or capacity, one or more conditions in the code of a self-executing program, which is specific to the action to be performed, may cause the action to be performed (or not performed) based on the detected availability or capacity. By doing so, the system is further insulated from the loss of a device in the network.

Further in view of the aforementioned technical problems, systems and methods are described herein for providing on-demand access to resources across global or cloud computer networks using artificial intelligence models (e.g., transformer models). In particular, systems and methods are described herein for leveraging artificial intelligence models to estimate proxy resource availabilities or capacities and use these proxy resource availabilities or capacities to enable on-demand access to resources. While the previously described systems addressed the “when” to perform an action given the availability of a resource, additional systems described herein work to further overcome the previously mentioned technical flaw by determining “if” the action can be performed given the availability of a resource. More specifically, if the systems determine that the action cannot be performed given the availability of the resource, the system can estimate a proxy availability of the resource. This proxy can serve in place of the tokenized resource currently available to enable the action to be performed. As a result, the systems and methods can mitigate issues related to resources being unavailable or inaccessible by predicting when those resources are likely to be needed and whether those resources include tokenized availabilities or capacities suitable for execution of a corresponding action.

To enable such "on-demand" resource availability, the described technical solutions leverage artificial intelligence models, such as transformer models, to determine proxy tokenized availabilities or capacities of a resource. The proxy tokenized availabilities or capacities can be used in lieu of the tokenized availabilities or capacities of the resource currently available to determine whether the condition for performing the blockchain action has been satisfied. In this way, even if a tokenized availability or capacity of a resource from the blockchain network fails to satisfy a condition for performing the blockchain action, the proxy tokenized availability or capacity can be harnessed and used to enable the blockchain action to be performed.

The artificial intelligence models can generate the proxy tokenized availabilities or capacities based on events associated with the resource from the blockchain network. The events can correspond to blockchain actions that have been performed previously. The events can form a sequence, which imparts an ordering to the actions. This sequence can be passed to the artificial intelligence model, which can, for example, generate a representation of the events (e.g., an embedding). Using the representation, the artificial intelligence model can determine (i.e., map) the representation to a proxy tokenized availabilities or capacity of the first resource.

In some embodiments, the first request may request to use a credit line of a third party. In response, the system may determine to use a proxy tokenized capacity provider by the third party. For example, in some embodiments, the proxy tokenized capacity may be a representation of client deposit or bank liability-in cash (1:1 value) in a tokenized database. The amount may be exchanged to fiat upon demand by a client (e.g., settlement may by instantaneous). Alternatively, the proxy tokenized capacity may be based on the issuance of an instrument that represents the third party's obligation to pay in a tokenized database. This may not be a cash representation, but instead a willingness to pay when required conditions are met. The payment may also be instantaneous upon a successful request.

In some aspects, systems and methods for determining availability of resources across global or cloud networks while mitigating issues related to providing services with unstable resources are described. For example, the system may receive a first request, at a first action specific self-executing program, to perform a first blockchain action using a first resource, wherein the first blockchain action is encoded in the first action specific self-executing program. The system may determine, at the first action specific self-executing program, a first condition for performing the first blockchain action, wherein the first condition is encoded in the first action specific self-executing program. The system may receive, by the first action specific self-executing program, a first tokenized capacity of the first resource from a first blockchain network. The system may determine, by the first action specific self-executing program, whether to perform the first blockchain action based on comparing the first condition to the first tokenized capacity. The system may execute the first blockchain action, by the first action specific self-executing program, based on determining to perform the first blockchain action, wherein executing the first blockchain action causes the first tokenized capacity of the first resource to be transferred to a second resource.

In some aspects, systems and methods for providing on-demand access to resources across global or cloud computer networks by using transformer models to estimate proxy resource capacities and leveraging the proxy resource capacities to enable on-demand access to the resources are described. For example, the system may retrieve event data representing a sequence of events associated with a first resource from a blockchain network. The system may receive, using an action specific self-executing program, a first request to perform a blockchain action using the first resource. The system may determine, using the action specific self-executing program, based on the first request, that a first tokenized capacity of the first resource from the blockchain network fails to satisfy a condition for performing the blockchain action. The system may provide, using the action specific self-executing program, the event data and the first request to a trained artificial intelligence model to obtain a proxy tokenized capacity of the first resource. The system may transmit, using the action specific self-executing program, a second request to complete an off-chain action corresponding to the blockchain action based on the proxy tokenized capacity of the first resource satisfying the condition for performing the blockchain action. The system may execute, using the action specific self-executing program, based on the second request, the blockchain action to cause the proxy tokenized capacity of the first resource to be transferred to a second resource.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
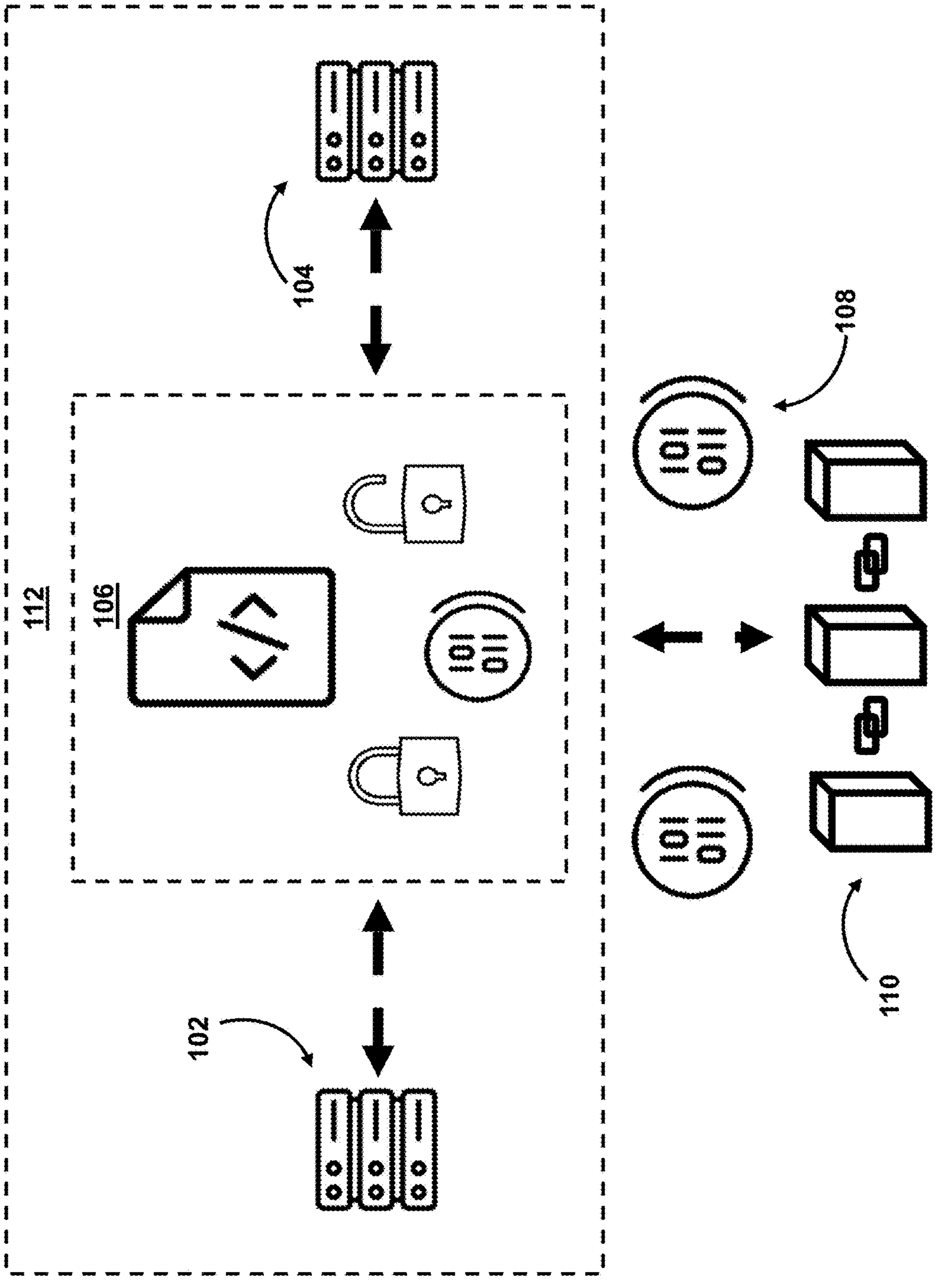
FIGS. 1A-1C show an illustrative diagram for managing resources, in accordance with one or more embodiments.
Figure 1B:
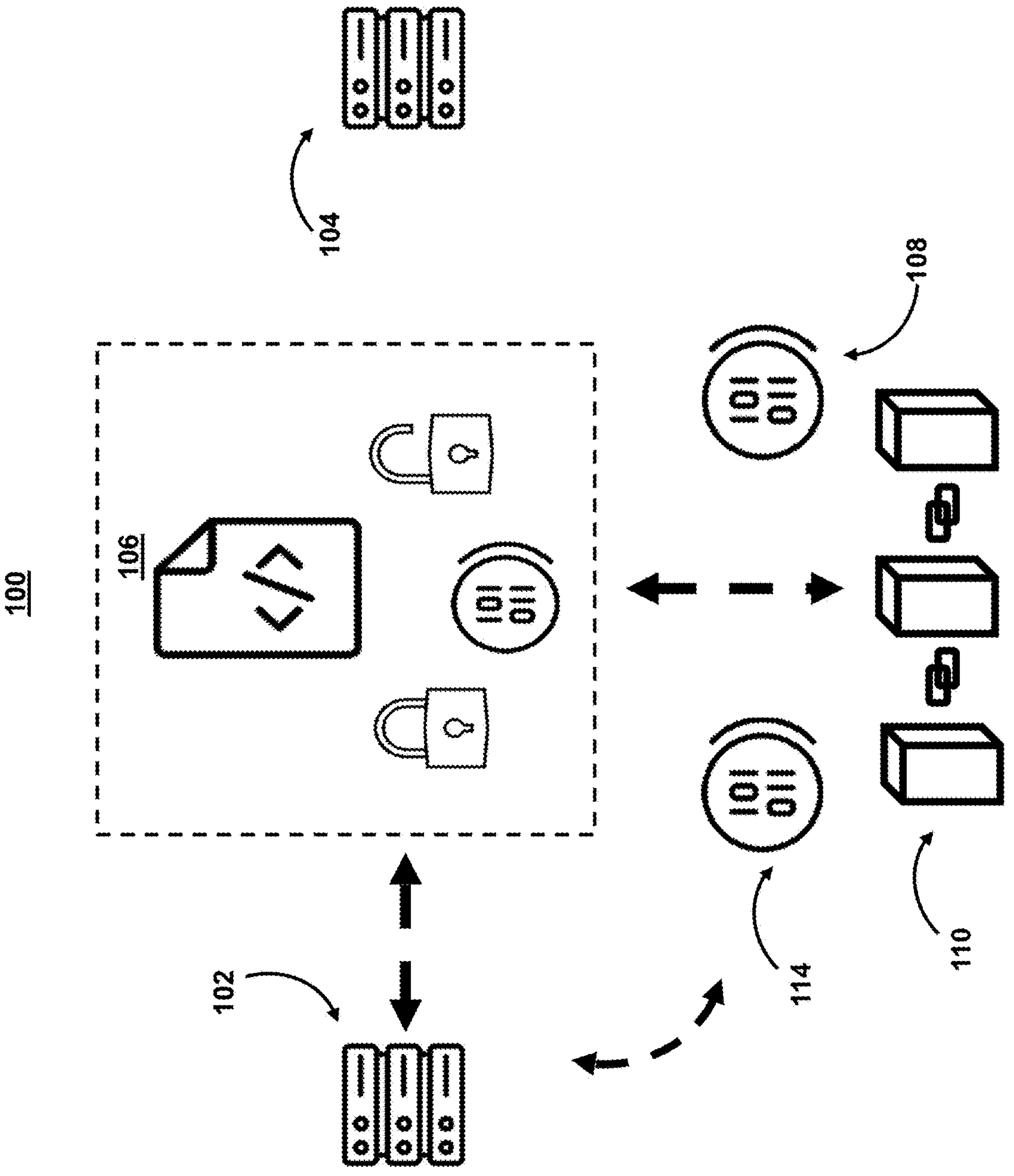
Figure 1C:
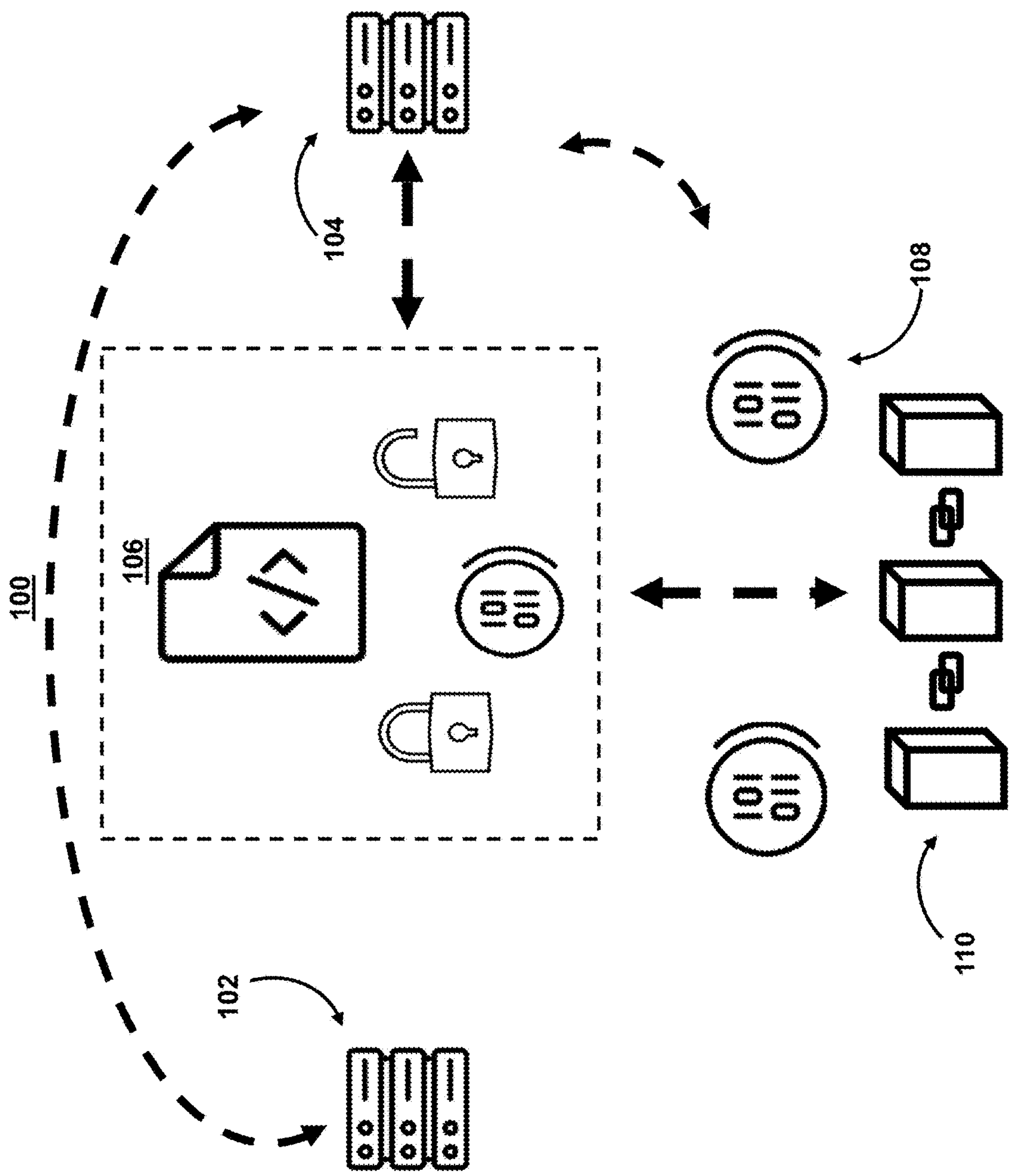

FIGS. 1A-1C show an illustrative diagram for managing resources, in accordance with one or more embodiments. FIG. 1A shows an illustrative architecture for managing resources across global or cloud networks, in accordance with one or more embodiments. For example, system 100 includes a network between two resources (e.g., resource 102 and resource 104). As described herein, a resource may refer to any entity or component within the network that is made available and accessible for use by network users, applications, or devices. These resources can be hardware devices, software applications, or data that are shared across the network for various purposes.

Hardware devices may include physical devices connected to the network that can be shared among multiple users or applications. Examples of hardware resources in a network include printers, scanners, servers, routers, switches, storage devices (like NAS-Network Attached Storage), and other peripheral devices. Software resources may be software applications, programs, or services made available for access and utilization over the network. This could include shared databases, file servers, web servers, email servers, application servers, and any other software-based services accessible to network users. Data resources refer to information or data stored and shared within the network. This could include shared files, documents, databases, multimedia content, and any other data that can be accessed and utilized by authorized users or applications within the network. Network resources are typically made accessible through a process called resource sharing or resource sharing protocols, which allow authorized users or devices to access, use, or modify these resources based on permissions and security configurations set by the network administrators. For instance, in a client-server network model, a server could host resources such as files or applications, and client devices can request access to these resources over the network. Access control mechanisms, such as user authentication and permissions, regulate who can access specific resources and what actions they can perform on those resources.

In some embodiments, resources may encompass a wide array of assets, tools, and components that are essential for conducting operations, delivering services, managing finances, and supporting a financial service firm's overall functioning. For example, a resource may comprise financial assets. Financial assets include cash reserves, investments, securities, loans, and other financial instruments held by the firm or managed on behalf of clients. For example, a resource corresponding to a user may comprise a bank account for that user.

In some embodiments, a resource may comprise a bank branch or other subdivision of the firm and/or an amount of liquidity for the bank branch or subdivision. For example, when a resource is a bank branch or other subdivision, the resource may go on and/or off-line based on the operating hours (or regulated trading hours) for the bank branch or subdivision. For example, banks and financial institutions often have specific business hours during which their systems and staff are available to process transactions. Outside these hours, certain banking functions, including fund transfers, may not be processed immediately. Some financial regulations or rules may limit or dictate the processing of certain types of transactions or transfers after regular business hours for security, compliance, or fraud prevention purposes. Banks may also risk management measures in place to detect and prevent fraudulent activities. Transactions initiated after hours may be flagged for additional scrutiny to ensure they are legitimate, which could cause delays.

In some embodiments, system 100 may illustrate one or more communications between resource 102 and resource 104 as managed by a platform application. For example, a platform application may be used to facilitate one or more blockchain actions (e.g., via self-executing program 106) to conduct the communications across computer network 112. In some embodiments, blockchain actions may also comprise actions related to a self-executing program (e.g., a smart contract). As referred to herein, a "self-executing program" comprises a program in which rules for execution are written into lines of code. The code and the rules contained therein may then exist across a distributed, decentralized blockchain network. For example, a self-executing program may comprise a contract in which the terms of the agreement between buyer and seller are written into lines of code. In some embodiments, the self-executing program may be a program in which rules for execution are written into lines of code that is executed in response to a trigger.

As referred to herein, a computer network may refer to a collection of interconnected computers and other devices that are linked together to share resources, information, and services. These networks can be established using various technologies and configurations, allowing devices to communicate and exchange data with each other. In some embodiments, the computer network may comprise a network for a financial services firm.

In some embodiments, a computer network (or simply network) may refer to the interconnected system of computers, devices, and infrastructure specifically designed and configured to support the operations and services provided by a financial service firm and/or the financial industry. The network infrastructure may enable the firm to process transactions efficiently and securely. This includes services like online banking, wire transfers, trading platforms for stocks and securities, electronic fund transfers, and other financial transactions. For example, financial firms often require connectivity to various financial markets, exchanges, and data providers. The network infrastructure allows access to real-time market data, trade execution platforms, and connections to external financial systems.

In some embodiments, the computer network may comprise a global payment network that facilitate credit and debit card transactions. The network may connect issuing banks, acquiring banks, merchants, and cardholders, enabling electronic payments at point-of-sale terminals and online. In some embodiments, the computer network may comprise an ACH (Automated Clearing House). An ACH is a network used for electronic fund transfers and direct deposits in the United States. It enables the processing of large volumes of credit and debit transactions, including payroll deposits, bill payments, and person-to-person transfers. In some embodiments, the computer network may comprise a SWIFT (Society for Worldwide Interbank Financial Telecommunication) network. SWIFT is a global messaging network used by financial institutions for secure communication and the transfer of financial messages, particularly for international transactions and cross-border payments. In some embodiments, the computer network may comprise a blockchain network.

As described herein, a "platform application" may refer to software or an application that serves as a foundation or infrastructure for developing and deploying other software applications or services. It provides a set of tools, frameworks, and functionalities upon which developers can build, integrate, and run applications. These platforms form the basis for running other software applications. Examples include Windows, macOS, Linux, iOS, and Android. They provide the necessary environment and services for software to execute on devices like computers, smartphones, and tablets.

In some embodiments, the platform application may be used to manage the availability of devices in a computer network (e.g., a "platform management application"). This type of platform application is designed to monitor, control, and manage various devices and components within a network to ensure their availability, performance, and security. The platform application may automatically identify and map devices present on the network, including computers, routers, switches, servers, printers, and other network-connected devices. The platform application may constantly monitor the status and performance metrics (such as bandwidth usage, CPU usage, memory, etc.) of network devices to identify any abnormalities or performance bottlenecks. The platform application may generate alerts or notifications when certain predefined thresholds are breached or when anomalies in network behavior are detected. This helps in proactive issue resolution and prevents network downtime. The platform application may allow administrators to centrally manage and update device configurations, ensuring consistency and compliance with network policies and standards. The platform application may monitor the network for security threats, unauthorized access attempts, malware, and other vulnerabilities, providing insights into potential security breaches.

In some embodiments, the platform application may comprise a platform application for a financial services firm. A platform application, in the context of a financial services firm or a global bank, typically refers to a software application or system that serves as a foundation or framework for delivering various financial services, managing transactions, facilitating communication, and supporting interactions between different entities within the firm or with external stakeholders such as clients, partners, or regulatory bodies. These platform applications may be designed to integrate multiple functionalities and services within a unified infrastructure. These functionalities and services may encompass various aspects such as banking operations (e.g., day-to-day banking operations including customer onboarding, account management, transaction processing, and compliance), trading (e.g., trading functionalities for various financial instruments like stocks, bonds, derivatives, and currencies), risk management (e.g., risk assessment and management tools to monitor and mitigate risks across different financial activities), Customer Relationship Management (CRM) (e.g., functionalities that manage client interactions, track customer preferences, and personalize services), data analytics and reporting (e.g., capabilities that derive insights from large volumes of financial data), compliance and regulatory requirements (e.g., features to ensure compliance with various financial regulations and standards), mobile and online banking (e.g., mobile applications and online banking portals).

In some embodiments, the system receiving the first request may comprise receiving, at a platform management application, a user request to perform a first off-chain action. The system may then determine that a first blockchain action corresponds to the first off-chain action. For example, a user may initiate a request for a specific action that needs to be performed off-chain. This request could come through a user interface, API call, or any other user interaction method supported by the platform. The user request is received by the system and routed to a platform management application that serves as the central control or coordination point for managing various actions within the system. The platform management application analyzes the received user request and identifies the nature of the action requested. It parses and understands the details of the requested off-chain action, such as its purpose, parameters, and requirements. The system, through its logic or predefined mapping rules, identifies that the requested off-chain action has a corresponding action or operation that needs to be executed on the blockchain. This mapping could be based on predetermined correlations between off-chain and on-chain actions within the system's architecture or business logic.

The platform management application may validate the user request, ensuring it meets necessary criteria, security checks, and any required authorizations before proceeding further. Upon recognizing the corresponding blockchain action linked to the off-chain request, the system prepares the necessary data, parameters, or transaction details (e.g., other resources involved in the blockchain action) required to execute the corresponding action on the blockchain. For example, the system may receive a first user request to perform a first off-chain action determining that the first blockchain action corresponds to a second resource (e.g., a transaction from a first resource to a second resource).

Using appropriate mechanisms or interfaces (e.g., one or more self-executing programs, APIs, etc.), the platform management application triggers the execution of the determined blockchain action that aligns with the requested off-chain action. The prepared blockchain action is broadcasted to the blockchain network, initiating the process of validating, processing, and confirming the action by network nodes or validators. Validators in the blockchain network process the transaction, execute the action according to the defined logic, and include the validated transaction in a block. Once confirmed and added to the blockchain, the action is considered completed on-chain. The platform management application updates the status of the user request, providing feedback or notifications to the user about the successful execution of the requested action, whether it is off-chain or on-chain.

System 100 (e.g., using a platform application) may facilitate the performance of an off-chain action. As described herein, an "off-chain action" may refer to any activity or transaction that occurs outside the underlying blockchain network or protocol. Off-chain actions can take various forms, including off-chain transactions. These are transactions that occur outside the main blockchain network. They are conducted through secondary layers or channels and are settled or reconciled on-chain later. This helps in reducing congestion on the main chain and lowering transaction fees. Off-chain actions may also comprise off-chain computations. For example, complex computations or operations that are computationally expensive can be performed off-chain. For instance, certain computations or processes needed to support a decentralized application (DApp) might be handled off-chain to improve performance and reduce latency, with only the final outcome or necessary data being recorded on the blockchain.

For example, in the context of blockchain technology, on-chain data and assets are those that are recorded and stored directly on the blockchain. In contrast, off-chain data or assets are not directly stored on the blockchain but are instead managed off the blockchain. For example, off-chain data may be information that is not stored on the blockchain but is referenced or linked to it. This could include data stored in traditional databases, external files, or other systems. Off-chain assets may be assets that are represented or exist in the physical world or in other systems, but their ownership or status is tracked and managed on the blockchain. This could include real-world assets like real estate, commodities, or even digital assets that are not stored directly on the blockchain.

In some embodiments, off-chain actions may also comprise state channels, rollups, and/or sidechains. For example, these are off-chain scaling solutions that enable parties to conduct transactions or execute self-executing programs off the main chain. State channels allow participants to interact directly with each other off-chain, updating the state between them, while sidechains are separate blockchains that can be connected to the main blockchain, facilitating faster and more scalable transactions. In the context of blockchain and cryptocurrency, a "rollup" may be a layer 2 scaling solution. It is designed to improve the efficiency and scalability of blockchain networks. Rollups work by processing and bundling multiple transactions off-chain, and then submitting a single transaction to the main blockchain. This helps reduce congestion and lower transaction costs.

In some embodiments, off-chain actions may also comprise usage of off-chain data storage. For example, storing large amounts of data directly on a blockchain can be inefficient and costly. Off-chain data storage solutions, such as decentralized storage networks (e.g., IPFS, Filecoin), enable the storage of data off-chain while maintaining references or proofs of the data's existence or integrity on the blockchain.

In some embodiments, an off-chain action (or result thereof) may refer to any data, information, or transactional details that are stored, processed, or maintained outside of the primary blockchain network. In blockchain technology, off-chain records exist separately from the main distributed ledger or blockchain itself. For example, an off-chain record may comprise a user bank account and/or other account linked to a user and/or other entity.

To facilitate the off-chain action, system 100 may use one or more on-chain actions related to network 110. Network 110 may comprise a blockchain. As described herein, a blockchain is a decentralized ledger of transactions built upon a combination of cryptography techniques (e.g., secret-keys, hash functions, etc.), consensus mechanisms (e.g., Proof of Work, Proof of Stake, etc.), and computer networks (e.g., peer-to-peer ("P2P") networks, the Internet, etc.). The blockchain stores information electronically, grouped together into a series of subsets of the information, called "blocks." The information may be maintained by a network of computers using cryptography and consensus mechanisms, which make them practically impossible to hack or alter. Specifically, the integrity of the information in each block may be maintained through one-way cryptographic functions that make the information immutable for practical purposes.

As blocks of information are added, the various blocks form a chain, which represents an immutable record of all the previous transactions across the network. Given the immutability of the records, the public availability of the information in the blockchain, and the reliance on consensus mechanisms for adding new blocks, the blockchain does not require a central authority to monitor transactions, maintain records, and/or enforce rules. As such, blockchains and blockchain technology has become a foundation of many decentralized applications.

For example, network 110 may comprise a digital log. A digital log may comprise a record or file that captures and stores a chronological sequence of events, actions, or transactions in a digital format. These logs serve various purposes across different domains, including information technology, cybersecurity, finance, and more. Digital logs may maintain a time-sequenced record of activities, events, or changes. Each entry in the log file typically includes a timestamp indicating when the event occurred. The digital log may contain specific details about the events or actions being logged. This information could include user activities, system events, errors, security-related events, transactions, or changes in configurations. Digital logs can be stored in various formats, including text files, structured databases, JSON, XML, or other formats that suit the specific requirements of the system or application generating the logs. The digital logs may be used for diagnosing issues, troubleshooting problems, monitoring system performance, conducting forensic analysis, and auditing activities. They serve as a historical record for understanding past actions or incidents.

In some embodiments, the digital log may comprise a distributed ledger (e.g., for a blockchain) and/or other index of blockchain data. For example, the distributed ledger may be a type of database or digital ledger that exists across multiple locations or nodes within a decentralized network. It records transactions, contracts, or any form of data in a secure, transparent, and tamper-evident manner without the need for a central authority or intermediary. Unlike traditional centralized ledgers, distributed ledgers are not controlled by a single entity. Instead, they are distributed among multiple participants or nodes in a network, each maintaining an identical copy of the ledger. This decentralization increases transparency and resiliency by eliminating a single point of control or failure. Distributed ledgers use consensus mechanisms among network participants to validate and agree upon the state of the ledger. Consensus protocols ensure that all copies of the ledger across the network are in sync and agree on the validity of transactions, maintaining a consistent record of data. Once information is added to the ledger, it becomes virtually immutable, meaning it cannot be altered or deleted retroactively without consensus from the network. The use of cryptographic techniques ensures the security and integrity of the data stored on the ledger.

Network 110 may be used by system 100 to manage and/or facilitate one or more cryptographically secure digital assets (e.g., asset 108). A cryptographically secure digital asset may comprise a tokenization of a value or asset (e.g., a tokenized bank deposit). For example, a cryptographically secure digital asset refers to a digital representation of value, ownership, and/or rights that is secured by cryptographic techniques, ensuring its integrity, authenticity, and/or protection against unauthorized access or modification. These assets exist in digital form and rely on cryptographic protocols and technologies for their security and verification. For example, the asset's security may be based on cryptographic algorithms and techniques that provide strong encryption, hashing, digital signatures, and other cryptographic mechanisms to protect its data and transactions. The cryptographically secure digital assets may operate on blockchain networks. Blockchains use decentralized and distributed ledger technology, ensuring tamper-proof records of transactions and asset ownership. Transactions involving these assets are recorded on a blockchain, creating an immutable and transparent history of ownership and transactional history. Once recorded, data on the blockchain cannot be altered retroactively without consensus from the network. Cryptographically secure digital assets allow ownership and transfer of value or rights in a decentralized manner. Users can securely transfer ownership or conduct transactions directly without relying on intermediaries. Users may access and manage these assets using cryptographic keys. Public and private keys allow users to securely interact with the assets, sign transactions, and prove ownership without revealing sensitive information.

Network 110 may be used to facilitate communications (e.g., blockchain actions) irrespective of whether a resource is on-line. For example, a resource in a network may be "online," whether it is a device, service, and/or application, when it is currently connected and available for communication and interaction within the network. In contrast, a resource may be off-line when it is not on-line. For example, the term "online" signifies that the resource is active, operational, and accessible to other devices or users in the network. Being online implies that the resource is powered on, connected to the network infrastructure (such as the internet or a local network), and ready to send, receive, or process data, requests, or commands.

For example, a computer, server, printer, or any network-connected device is considered online when it is powered up, connected to the network (via Ethernet or Wi-Fi), and ready to send and receive data. In another example, applications, websites, or cloud-based services may be online when their servers are operational, connected to the internet, and available for users to access or utilize their functionalities. In yet another example, being online indicates that the resource is reachable and responsive to requests or communication attempts from other devices or users on the network. For example, in embodiments, in which the resource is a bank account, bank branch, etc. the resource may be on-line when the resource (or assets held by the resource) are reachable and responsive to requests or communication attempts from other devices or users on the network.

In some embodiments, system 100 may be used to manage resources across network 110. For example, system 100 may manage resources based on the availability of resources in network 110. In some embodiments, availability may comprise resource availability. Resource availability in a computer network may refer to the accessibility and readiness of various network resources, devices, services, or applications for use by authorized users or other components within the network. It signifies the ability of these resources to fulfill requests, process data, or perform tasks effectively and efficiently when required. For example, availability may correspond to device accessibility (e.g., the ability of devices (such as computers, servers, routers, switches, printers, etc.) to be reachable and responsive on the network), service uptime (e.g., time services remain operational and responsive to user requests), bandwidth and performance (e.g., resources promptly accessing and/or delivering data or services efficiently without delays or bottlenecks), data and information access (e.g., availability of data resources, databases, files, and information required by users or applications within the network).

In some embodiments, availability may correspond to liquidity. Liquidity refers to the ability of a bank or financial institution to meet its short-term obligations and fund its day-to-day operations efficiently. It represents the availability of liquid assets that can be quickly converted into cash to cover liabilities, withdrawals, or unexpected demands for funds. Banks maintain liquidity primarily through liquid assets such as cash, reserves held at central banks, short-term government securities, highly marketable securities, and other instruments that can be easily sold or converted into cash without significant loss of value. Banks may engage in asset-liability management to balance their assets and liabilities, ensuring that they have sufficient liquid assets to cover liabilities and maintain a healthy liquidity position. For example, a tokenized capacity of a resource may correspond to assets available at a given resource (e.g., a digital account). The transfer of this may correspond to the assets being transferred from one resource to another.

In some embodiments, the system may determine one or more characteristics of availability in one or more resources. The system may then select a cryptographically secure digital asset, from a plurality of cryptographically secure digital assets, based on the characteristics. For example, the system (or self-executing program) may determine a condition for performing the first blockchain action and select a first cryptographically secure digital asset, from a plurality of cryptographically secure digital assets, based on the condition. For example, the condition may indicate a requirement for a cryptographically secure digital asset as recorded in a predetermined digital log corresponding to the first resource. For example, the self-executing program condition may determine a requirement for a first cryptographically secure digital asset, as recorded in a predetermined digital log corresponding to a resource, involves encoding specific criteria or rules within the self-executing program's code to validate the possession or existence of the digital asset before executing certain actions or operations. For example, developers encode conditions within the self-executing program's code using a programming language suitable for self-executing programs (e.g., Solidity for Ethereum). These conditions define the rules or requirements that need to be met regarding the possession or existence of the cryptographically secure digital asset. The self-executing program may interact with a predetermined digital log or ledger that records information related to resources. The condition within the program may check this log to verify the presence or ownership of the specific digital asset corresponding to the resource. The condition may specify requirements such as verifying the ownership of the digital asset through cryptographic keys, checking the asset's unique identifier or token ID, validating a specific transaction or event recorded in the digital log related to the asset, or confirming its existence in a specific state. When a user initiates an action or transaction involving the resource within the self-executing program, the condition is evaluated. If the condition verifies the possession or existence of the required cryptographically secure digital asset in the predetermined digital log, the self-executing program proceeds with the intended operation or execution.

As described herein, a characteristic of availability may comprise any attribute that distinguishes the availability (or availability on a resource) from other availability (or availability on another resource). In some embodiments, characteristics of availability in resources within a computer network may refer to attributes or factors that define the accessibility, reliability, and continuity of these resources. For example, in embodiments describing the transfer of availability, the availability may be transferred by a change (or transfer) of a characteristic of the availability being transferred.

For example, a characteristic may refer to uptime and reliability as availability is associated with the ability of resources to remain operational and accessible over time without unexpected interruptions. High availability implies minimal downtime and consistent reliability. In another example, a characteristic may refer to accessibility. Available resources should be easily accessible and reachable by users or systems when needed. This includes factors such as network connectivity, response time, and the absence of barriers preventing access. In another example, a characteristic may refer to redundancy and fault tolerance. Systems designed with redundancy have backup mechanisms or duplicate resources to ensure continuous operation even if one component fails. Fault-tolerant systems can detect and recover from failures without significant impact on availability. In another example, a characteristic may refer to resilience to failures. Availability may be linked to a system's resilience against failures caused by hardware malfunctions, software errors, network issues, or other disruptions. Systems designed for high availability can withstand failures and maintain functionality. In another example, a characteristic may refer to scalability and capacity planning. Availability considerations involve the ability to scale resources to meet increasing demand without compromising performance or accessibility. Proper capacity planning ensures resources are available as needed. In another example, a characteristic may refer to monitoring and maintenance. Continuous monitoring, proactive maintenance, and timely interventions play a crucial role in ensuring resource availability. Monitoring tools help detect issues early, allowing for prompt resolution and minimizing downtime. In another example, a characteristic may refer to recovery and disaster preparedness. Availability includes having recovery strategies and disaster preparedness plans in place. These plans help restore services quickly after unexpected events, such as natural disasters or cyber-attacks. In another example, a characteristic may refer to service level agreements (SLAs) characteristics. Defining and adhering to SLAs regarding availability metrics, such as uptime percentage, response time, and maintenance windows, is essential in ensuring commitments to users or customers.

In another example, a characteristic may refer to geographical distribution and load balancing. Distribution of resources across multiple geographical locations and load balancing techniques contribute to availability by ensuring even distribution of workload and minimizing the impact of localized disruptions. In another example, a characteristic may refer to security measures. Availability is linked to security practices that protect resources from unauthorized access, cyber threats, or malicious attacks. Security measures prevent service disruptions caused by security breaches. In another example, a characteristic may refer to documentation and recovery procedures. Maintaining comprehensive documentation and well-defined recovery procedures helps restore services efficiently in case of outages or failures, minimizing the impact on availability.

In some embodiments, a characteristic of availability may refer to a characteristic of a good, service, and/or medium of exchange (e.g., money). The characteristics of currency, which is issued by governments and central banks. For example, a characteristic may refer to an issuing authority (e.g., a recognized government or central monetary authority within a country), legal tender (e.g., whether it is authorized by the government for settling debts, transactions, and payments within the country's borders), denomination and/or amount, physical form (e.g., banknotes and coins), type (e.g., fiat, commodity-backed), security features, exchange rate, stability, regulation, etc.

Selecting a cryptographically secure digital asset from a plurality of such assets based on characteristics involves a process that considers various attributes or features associated with these assets. The system may identify the specific characteristics or attributes that are essential for the system's purpose or requirements. These criteria could include factors such as security features, transaction speed, scalability, decentralization, consensus mechanism, token standard (e.g., ERC-20, ERC-721), utility, or network adoption. The system may obtain information and data about the plurality of cryptographically secure digital assets under consideration. This information may include technical specifications, whitepapers, historical performance, market data, developer community, security audits, and use case relevance. The system may evaluate and compare the characteristics of each digital asset against the predefined selection criteria. Assess how well each asset aligns with the system's requirements, considering factors like security, functionality, transaction costs, liquidity, governance, or regulatory compliance. The system may apply a weighted scoring system or ranking mechanism to assign importance or priority to different characteristics based on their relevance to the system's goals. For example, security might have higher weightage compared to transaction speed. The system may conduct both quantitative analysis (e.g., metrics, performance data) and qualitative analysis (e.g., community support, development activity) to comprehensively assess the assets' characteristics. In some embodiments, the system may employ decision models or algorithms that factor in the weighted criteria and analysis to generate a scoring system or rank the assets based on their suitability for the system's requirements.

FIG. 1B shows an illustrative architecture for managing resources across global or cloud networks, in accordance with one or more embodiments. For example, in FIG. 1B, system 100 may receive, at a platform application, a first user request to perform a first off-chain action. For example, the first off-chain action may represent resource 102 (e.g., a buyer) creating a self-executing program (e.g., self-executing program 106). The system may determine a first blockchain action that corresponds to the first off-chain action. As referred to herein, a self-executing program (or smart contract) may comprise a program with predefined terms (e.g., terms of an agreement between buyer and seller) written into the code of the program. The self-executing program may be implemented on blockchain platforms, such as Ethereum, which allows for decentralized and automated execution of terms without the need for intermediaries. The self-executing program may be programmed to automatically enforce, verify, and/or facilitate the negotiation or performance of a predefined term (e.g., contract), eliminating the need for a trusted third party. These programs may run on a blockchain, which is a distributed and immutable ledger that records all transactions across a network of computers.

System 100 may receive a first request, at a first action specific self-executing program, to perform a first blockchain action using a first resource, wherein the first blockchain action is encoded in the first action specific self-executing program. The request (e.g., a computer request) may refer to a communication or a query made by a computer or a software application to another computer, server, and/or device on a network. This request is typically initiated by a client computer seeking specific information, data, resources, or services from a server or another computing device. As described herein, an action-specific self-executing program may refer to a type of self-executing program designed to execute or facilitate a specific action, task, or set of predefined operations within a blockchain network. Unlike general-purpose self-executing programs that can handle various functions, an action-specific self-executing program is tailored to perform a particular action or a limited range of actions based on predefined conditions.

The system 100 may also receive a transfer of cash or other assets that are tokenized on the network 110 (e.g., the blockchain network) as cryptographically secure digital asset 114. For example, the system may determine, at the first action specific self-executing program (e.g., self-executing program 106), a first condition for performing the first blockchain action, wherein the first condition is encoded in the first action specific self-executing program. For example, the first condition may comprise a required amount of available digital assets (or cash or other assets) at a given resource.

In a self-executing program, a condition may refer to a predefined rule, criteria, or set of instructions written into the program's code that determines how the program operates or executes. Conditions establish the logic and parameters that must be met for the self-executing program to perform specific actions or trigger certain outcomes. Conditions define the logic or decision-making process within the self-executing program. They specify the circumstances under which the program will perform certain functions, make decisions, or execute predefined actions.

Conditions are often associated with trigger events or specific states within the blockchain network. When these trigger events occur, the conditions embedded in the self-executing program are evaluated, and corresponding actions are executed if the conditions are met. Conditions can depend on various input parameters, such as timestamps, user input, external data feeds, or the state of other programs or variables within the blockchain network. Based on the fulfillment or non-fulfillment of conditions, a self-executing program may execute specific actions, proceed with a transaction, release funds, transfer tokens, update states, or terminate its execution.

In some embodiments, the condition may be a time-based conditions (e.g., a self-executing program might have conditions that execute a particular action only after a specific date, time, or a defined duration has elapsed), threshold conditions (e.g., conditions might specify that a certain number of participants need to approve an action or that a certain amount of tokens needs to be accumulated before an action is executed), external data conditions (e.g., self-executing programs can incorporate external data sources, and conditions may rely on data retrieved from these sources to trigger actions).

Conditions in a self-executing program are encoded using programming languages and specific syntax within the code of the self-executing program. Self-executing programs are typically written in specialized programming languages, such as Solidity for Ethereum or Chaincode for Hyperledger Fabric, and these languages have their syntax and structures to encode conditions. In response to a user request, the system may write self-executing programs using programming languages specifically designed for blockchain platforms. They use the language's syntax and logic to encode conditions within the contract's code. Programming languages used for self-executing programs offer conditional statements (if, else if, else) that allow developers to specify conditions and define the actions or behaviors to be executed based on the evaluation of these conditions. The user request may define the logic, rules, and parameters for conditions within the contract's code. This includes specifying trigger events, input variables, comparison operations, and logical operators to create the conditions. Some self-executing program languages allow the creation of event handlers that can detect external triggers or changes in the blockchain state. These event handlers can be associated with specific conditions to execute actions when triggered.

Self-executing program 106 may then monitor for the tokenized capacity (e.g., cryptographically secure digital assets corresponding to a sale price in self-executing program 106). For example, the system may receive, by the first action specific self-executing program, a first tokenized availability or capacity of the first resource from a first blockchain network. Tokenized availability or capacity may refer to the representation or conversion of the availability of assets, resources, or services into digital tokens or cryptographic tokens on a blockchain or digital ledger. It involves using tokens as a representation or proof of ownership, access rights, or availability of certain resources within a decentralized network.

FIG. 1C shows an illustrative architecture for managing resources across global or cloud networks, in accordance with one or more embodiments. For example, system 100 may determine, by the first action specific self-executing program, whether to perform the first blockchain action based on comparing the first condition to the first tokenized availability or capacity. For example, the system may determine whether or not to execute the self-executing program. The system may make this determination based on one or more criteria.

As shown in FIG. 1C, the system may determine whether conditions of the self-executing program have been completed. In some embodiments, in response to determining to perform the first blockchain action, the system may transmit a second user request to complete the first off-chain action. For example, the system may determine whether a seller delivers services or goods to buyer in accordance with the self-executing program terms and conditions. In such cases, the system may query a buyer and/or seller or request other information of an off-chain action.

The system may execute the first blockchain action, by the first action specific self-executing program, based on determining that the first off-chain action is completed, wherein executing the first blockchain action causes the first tokenized availability or capacity of the first resource to be transferred to a second resource.

The system may receive, at the platform application, a confirmation of the first blockchain action being executed. A confirmation of a blockchain action being executed may refer to the acknowledgment or verification that a specific transaction or operation has been successfully processed and added to the blockchain.

Figure 2:
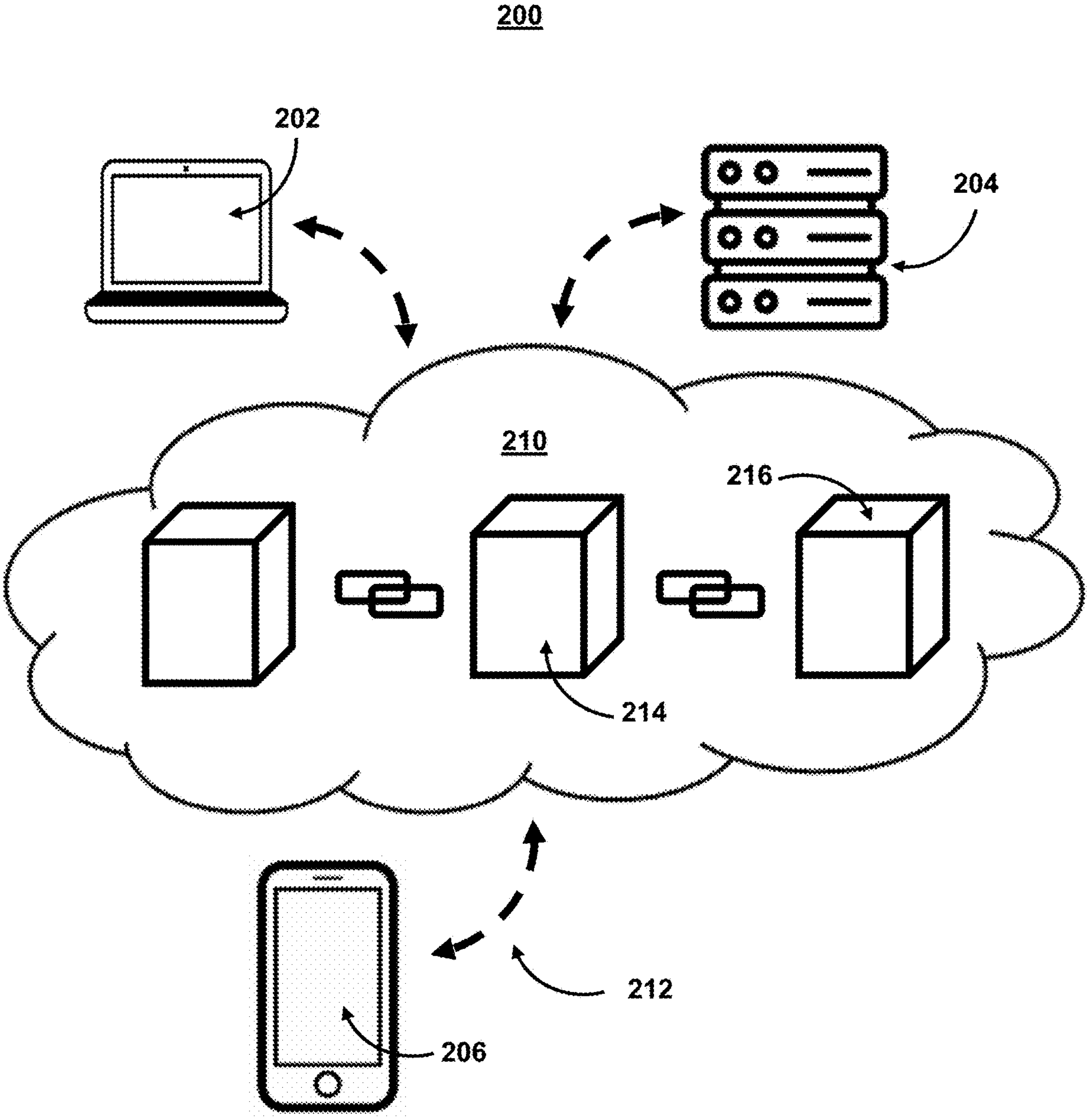
FIG. 2 shows an illustrative diagram of an embodiment featuring a blockchain network, in accordance with one or more embodiments.

FIG. 2 shows an illustrative diagram of an embodiment featuring a blockchain network, in accordance with one or more embodiments. For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by one or more clients, which behaves like an actual computer) for the system. The data structure may comprise one or more devices and/or components, which may act in concert to facilitate blockchain 210.

As referred to herein, blockchain 210 may comprise a type of distributed ledger technology that consists of growing list of records, called blocks (e.g., block 214 and block 216), that are securely linked together using cryptography. Each block may contain a cryptographic hash of the previous block (e.g., block 216 may contain a cryptographic hash of block 214), and that cryptographic hash may itself be based on a state of a preceding block (e.g., the cryptographic hash of block 216 is based not only on the state of block 214). For example, each block may include a timestamp and blockchain action data (e.g., represented as a Merkle tree, where data nodes are represented by leaves). The timestamp proves that the blockchain action data (e.g., the state of the block) existed when the block was created. As each block is based on information about the previous block, the blocks effectively form a chain with each additional block linking to the ones before it. Consequently, blockchain actions are irreversible in that, once they are recorded, the data in any given block cannot be altered retroactively without altering all subsequent blocks.

Blockchains are typically managed by a peer-to-peer (P2P) computer network for use as a public distributed ledger, where nodes collectively adhere to a consensus algorithm protocol to add and validate new transaction blocks. Although, in some embodiments, a blockchain may be managed by a private consortium of computers. While blockchain records are not unalterable, since blockchain forks are possible, blockchains may be considered secure by design and exemplify a distributed computing system with high Byzantine fault tolerance.

As shown in FIG. 2, system 200 comprises user device 202, user device 204, and user device 206. It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain action may equally be applied to, and correspond to, an individual user device (e.g., user device 202, user device 204, and/or user device 206) performing the blockchain action. That is, system 200 may correspond to the user devices (e.g., user device 202, user device 204, and/or user device 206) collectively or individually.

For example, system 200 may comprise a plurality of nodes for blockchain 210. Each node may correspond to a user device (e.g., user device 202, user device 204, and/or user device 206). A node for a blockchain network may comprise an application or other software that records and/or monitors peer connections to other nodes and/or miners for the blockchain network. For example, a miner comprises a node in a blockchain network that facilitates blockchain actions by verifying blockchain actions on the blockchain, adding new blocks to the existing chain, and/or ensuring that these additions are accurate. The nodes may continually record the state of the blockchain and respond to remote procedure requests for information about the blockchain.

In some embodiments, the user devices of system 200 may comprise one or more cloud components. For example, cloud components may be implemented as a cloud computing system and may feature one or more component devices. It should also be noted that system 200 is not limited to three devices. Users may, for instance, utilize one or more devices to interact with one another, one or more servers, or other components of system 200. It should be further noted that while one or more actions (e.g., blockchain actions) are described herein as being performed by a particular component (e.g., user device 202) of system 200, those actions may, in some embodiments, be performed by other components of system 200. As an example, while one or more actions are described herein as being performed by components of user device 202, those actions may, in some embodiments, be performed by one or more cloud components. In some embodiments, the various computers and systems described herein may include one or more computing devices that are programmed to perform the described functions. Additionally, or alternatively, multiple users may interact with system 200 and/or one or more components of system 200. For example, in one embodiment, a first user and a second user may interact with system 200 using two different components (e.g., user device 204 and user device 206, respectively). Additionally, or alternatively, a single user (and/or a user account linked to a single user) may interact with system 200 and/or one or more components of system 200 using two different components (e.g., user device 202 and user device 206, respectively).

With respect to the components of system 200, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 2, both user device 202 and user device 206 include a display upon which to display data (e.g., content related to one or more blockchain actions).

Additionally, the devices in system 200 may run an application (or another suitable program). The application may cause the processors and/or control circuitry to perform operations related to determining resource availability within a decentralized application environment.

Each of these devices may also include electronic storage. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 2 also includes network 212, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 3:
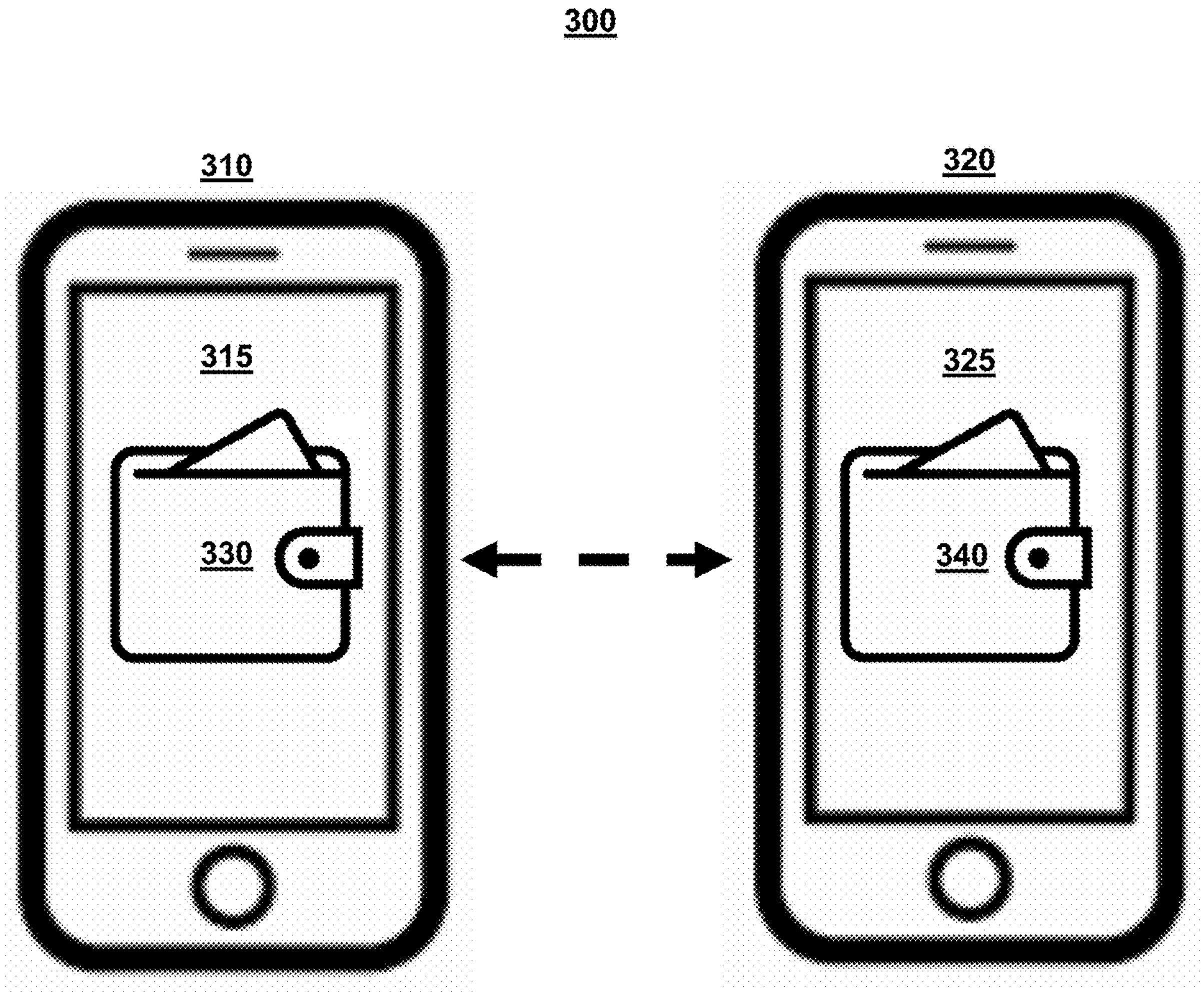
FIG. 3 shows an illustrative diagram for performing a blockchain action, in accordance with one or more embodiments.

FIG. 3 shows an illustrative diagram for conducting blockchain actions, in accordance with one or more embodiments. For example, the diagram presents various components that may be used to determine resource availability in some embodiments.

As referred to herein, a "blockchain action" may comprise any action including and/or related to blockchains and blockchain technology. For example, blockchain actions may include conducting transactions, querying a distributed ledger, generating additional blocks for a blockchain, transmitting communications-related nonfungible tokens, performing encryption/decryption, exchanging public/private keys, and/or other actions related to blockchains and blockchain technology. In some embodiments, a blockchain action may comprise the creation, modification, detection, and/or execution of a smart contract or program stored on a blockchain. For example, a self-executing program may comprise a program stored on a blockchain that is executed (e.g., automatically and/or without any intermediary's involvement or time loss following a trigger) when one or more predetermined conditions are met. In some embodiments, a blockchain action may comprise the creation, modification, exchange, and/or review of a token (e.g., a digital blockchain-specific asset), including a nonfungible token. A nonfungible token may comprise a token that is associated with a good, a service, a self-executing program, and/or other content that may be verified by, and stored using, blockchain technology. In some embodiments, blockchain actions may also comprise actions related to mechanisms that facilitate other blockchain actions (e.g., actions related to metering activities for blockchain actions on a given blockchain network).

FIG. 3 includes system 300, which includes user device 310 and user device 320, although other devices and/or components may also be featured in system 300 (e.g., one or more of devices and/or components shown in FIG. 2). User device 310 includes user interface 315. User device 320 includes user interface 325. As referred to herein, a "user interface" may comprise a mechanism for human-computer interaction and communication in a device and may include display screens, keyboards, a mouse, and the appearance of a desktop. For example, a user interface may comprise a way for a user interact with and/or access an application, website, and/or other program in order to determine resource availability. A user interface may display content related to resources. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

In some embodiments, gas may be obtained as part of a blockchain action (e.g., a purchase) using a network-specific cryptocurrency (e.g., ether in the case of Ethereum). The system may require gas (or the amount of the network-specific cryptocurrency corresponding to the required amount of gas) to be transmitted with the blockchain action as an earmark to the blockchain action. In some embodiments, gas that is earmarked for a blockchain action may be refunded back to the originator of the blockchain action if, after the computation is executed, an amount remains unused.

As shown in FIG. 3, one or more user devices may include a cryptography-based, storage application (e.g., cryptography-based, storage application 330 and cryptography-based, storage application 340) used to perform blockchain actions. The cryptography-based, storage application may be used to perform a plurality of blockchain actions across a computer network. For example, the cryptography-based, storage application may comprise a decentralized application that functions to perform one or more blockchain actions.

In some embodiments, the cryptography-based, storage application may comprise and/or be compatible with one or more application program interfaces (e.g., APIs). For example, an API may be implemented on user device 310 and/or communicate with an API implemented on user device 320. Alternatively, or additionally, an API may reside on one or more cloud components. For example, an API may reside on a server and comprise a platform service for a custodial wallet service, decentralized application, etc. An API (which may be a representational state transfer (REST) or web services API layer) may provide a decoupled interface to data and/or functionality of one or more applications.

The API may provide various low-level and/or blockchain-specific operations in order to facilitate resource management. For example, the API may provide blockchain actions such as blockchain writes. Furthermore, the API may perform a transfer validation ahead of forwarding the blockchain action (e.g., a transaction) to another service (e.g., a crypto service). The API may then log the outcome. For example, by logging to the blockchain prior to forwarding, the API may maintain internal records and balances without relying on external verification (e.g., which may take up to ten minutes based on blockchain updating activity).

The API may also provide informational reads. For example, the API (or a platform service powered by the API) may generate blockchain action logs and write to an additional ledger (e.g., an internal record and/or indexer service) the outcome of the reads. If this is done, a user accessing the information through other means may see consistent information such that downstream users ingest the same data point as the user. The API may also provide a unified API to access balances, transaction histories, and/or other blockchain actions activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

The API may provide a common, language-agnostic way of interacting with an application. In some embodiments, the API may comprise a web services API that offers a well-defined contract that describes the services in terms of their operations and the data types used to exchange information.

REST APIs do not typically have this contract; instead, they are documented with client libraries for most common languages including Ruby, Java, PHP, and JavaScript. Simple Object Access Protocol ("SOAP") web services have traditionally been adopted in the enterprise for publishing internal services as well as for exchanging information with partners in business-to-business ("B2B") transactions.

The API may use various architectural arrangements. For example, system 300 may be partially based on the API, such that there is strong adoption of SOAP and RESTful web services, using resources such as Service Repository and Developer Portal, but with low governance, standardization, and separation of concerns. Alternatively, system 300 may be fully based on the API, such that separation of concerns between layers such as an API layer, services, and applications are in place.

In some embodiments, the system architecture may use a microservice approach. Such systems may use two types of layers: front-end layers and back-end layers, where microservices reside. In this kind of architecture, the role of the API may be to provide integration between front-end and back-end layers. In such cases, the API may use RESTful APIs (exposition to front-end or even communication between microservices). The API may use the Advanced Message Queuing Protocol (AMQP), which is an open standard for passing business messages between applications or organizations. The API may use an open-source, high-performance remote procedure call (RPC) framework that may run in a decentralized application environment. In some embodiments, the system architecture may use an open API approach. In such cases, the API may use commercial or open-source API platforms and their modules. The API may use a developer portal. The API may use strong security constraints applying a web application firewall that protects the decentralized applications and/or the API against common web exploits, bots, and denial-of-service (DDOS) attacks. The API may use RESTful APIs as standard for external integration.

In some embodiments, the system may also use one or more Application Binary Interfaces (ABIs) and an alternative to and/or in addition to an API. An ABI is an interface between two program modules, often between operating systems and user programs. ABIs may be specific to a blockchain protocol. For example, ABI defines the methods and structures used to interact with the binary contract similar to an API, but on a lower level. The ABI indicates the caller of the function to encode (e.g., ABI encoding) the needed information like function signatures and variable declarations in a format that a virtual machine can understand to call that function in bytecode. ABI encoding may be automated by the system using compilers or wallets interacting with the blockchain.

The cryptography-based, storage application may, in some embodiments, correspond to a digital wallet. For example, the digital wallet may comprise a repository that allows users to store, manage, and trade their cryptocurrencies and assets, interact with blockchains, and/or conduct blockchain actions using one or more applications. The digital wallet may be specific to a given blockchain protocol or may provide access to multiple blockchain protocols. In some embodiments, the system may use various types of digital wallets such as hot wallets and cold wallets. Hot wallets are connected to the internet while cold wallets are not. Digital wallet holders may hold both a hot wallet and a cold wallet. Hot wallets are most often used to perform blockchain actions, while a cold wallet is generally used for managing a user account and may have no connection to the internet.

In some embodiments, the cryptography-based, storage application may correspond to a key-based wallet or a smart contract wallet. For example, a key based wallet may feature public or private keys and allow a user to either have control of the account or receive transactions in the account. A smart contract wallet may comprise blockchain programs or digital agreements that execute transactions between parties once a predetermined condition is met. For example, a smart contract wallet may be managed by a smart contract (e.g., or smart contract code) instead of a private key. As such, a smart contract wallet may improve speed, accuracy, trust, and/or transparency in blockchain actions. In some embodiments, a cryptography-based, storage application may include, or have access to, key-based wallet or a smart contract wallet. For example, the cryptography-based, storage application may comprise a digital or other construct (e.g., a reference, a pointer, a text on a blockchain, an address, etc.).

In some embodiments, to conduct a blockchain action, user device 310, user interface 315, and/or cryptography-based, storage application 330) may comprise, control, and/or have access to a private key and/or digital signature. For example, system 300 may use cryptographic systems for conducting blockchain actions such as resource management. For example, system 300 may use public-key cryptography, which features a pair of digital keys (e.g., which may comprise strings of data). In such cases, each pair comprises a public key (e.g., which may be public) and a private key (e.g., which may be kept private). System 300 may generate the key pairs using cryptographic algorithms (e.g., featuring one-way functions). System 300 may then encrypt a message (or other blockchain action) using an intended receiver's public key such that the encrypted message may be decrypted only with the receiver's corresponding private key. In some embodiments, system 300 may combine a message with a private key to create a digital signature on the message. For example, the digital signature may be used to verify the authenticity of blockchain actions. As an illustration, when conducting blockchain actions, system 300 may use the digital signature to prove to every node in the system that it is authorized to conduct the blockchain actions.

For example, user device 310 may request a blockchain action (e.g., conduct a transaction). The blockchain action may be authenticated by user device 310 and/or another node (e.g., a user device in the community network of system 300). For example, using cryptographic keys, system 300 may identify users and give access to their respective user accounts (e.g., corresponding digital wallets) within system 300. Using private keys (e.g., known only to the respective users) and public keys (e.g., known to the community network), system 300 may create digital signatures to authenticate the users.

Following an authentication of the blockchain action, the blockchain action may be authorized. For example, after the blockchain action is authenticated between the users, system 300 may authorize the blockchain action prior to adding it to the blockchain. System 300 may add the blockchain action to a blockchain (e.g., blockchain 210 (FIG. 2)) as part of a new block (e.g., block 216 (FIG. 2)). System 300 may perform this based on a consensus of the user devices within system 300. For example, system 300 may rely on a majority (or other metric) of the nodes in the community network to determine that the blockchain action is valid. In response to validation of the block, a node user device (e.g., user device 320) in the community network (e.g., a miner) may receive a reward (e.g., in a given cryptocurrency) as an incentive for validating the block.

To validate the blockchain action, system 300 may use one or more validation protocols and/or validation mechanisms. For example, system 300 may use a proof-of-work mechanism in which a user device must provide evidence that it performed computational work to validate a blockchain action and thus this mechanism provides a manner for achieving consensus in a decentralized manner as well as preventing fraudulent validations. For example, the proof-of-work mechanism may involve iterations of a hashing algorithm. The user device that successfully aggregates and records blockchain actions from a mempool (e.g., a collection of all valid blockchain actions waiting to be confirmed by the blockchain network) into the next block. Alternatively, or additionally, system 300 may use a proof-of-stake mechanism in which a user account (e.g., corresponding to a node on the blockchain network) is required to have, or "stake," a predetermined amount of tokens in order for system 300 to recognize it as a validator in the blockchain network.

In response to validation of the block, the block is added to a blockchain (e.g., blockchain 210 (FIG. 2)), and the blockchain action is completed. For example, to add the blockchain action to blockchain, the successful node (e.g., the successful miner) encapsulates the blockchain action in a new block before transmitting the block throughout system 300.

In some embodiments, a cryptography-based, storage application may comprise a decentralized application. As referred to herein, a "decentralized application" may comprise an application that exists on a blockchain and/or a peer-to-peer network. For example, a decentralized application may comprise an application that has a back end that is in part powered by a decentralized peer-to-peer network such as a decentralized, open-source blockchain with smart contract functionality.

For example, the cryptography-based, storage application (e.g., cryptography-based, storage application 330) may allow a user device (e.g., user device 310) to share files, access, and/or perform a blockchain action with another user device (e.g., user device 320) and/or cryptography-based, storage application (e.g., cryptography-based, storage application 340). For example, the peer-to-peer architecture and decentralized nature allows blockchain actions to be conducted between the user devices, without the need of any intermediaries or central authorities.

Figure 4A:
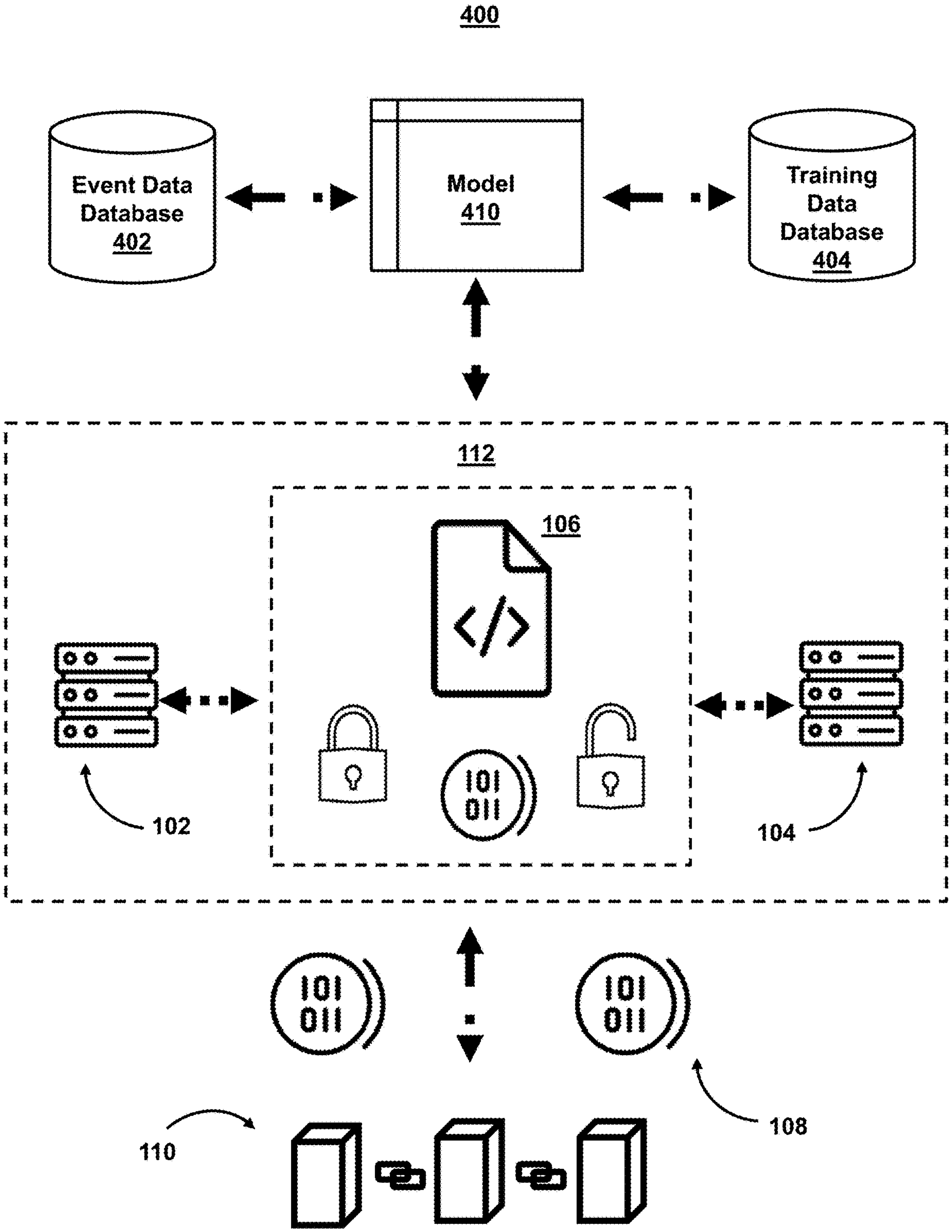
FIGS. 4A-4C show illustrative diagrams for managing resources leveraging one or more machine learning models, in accordance with one or more embodiments.
Figure 4B:
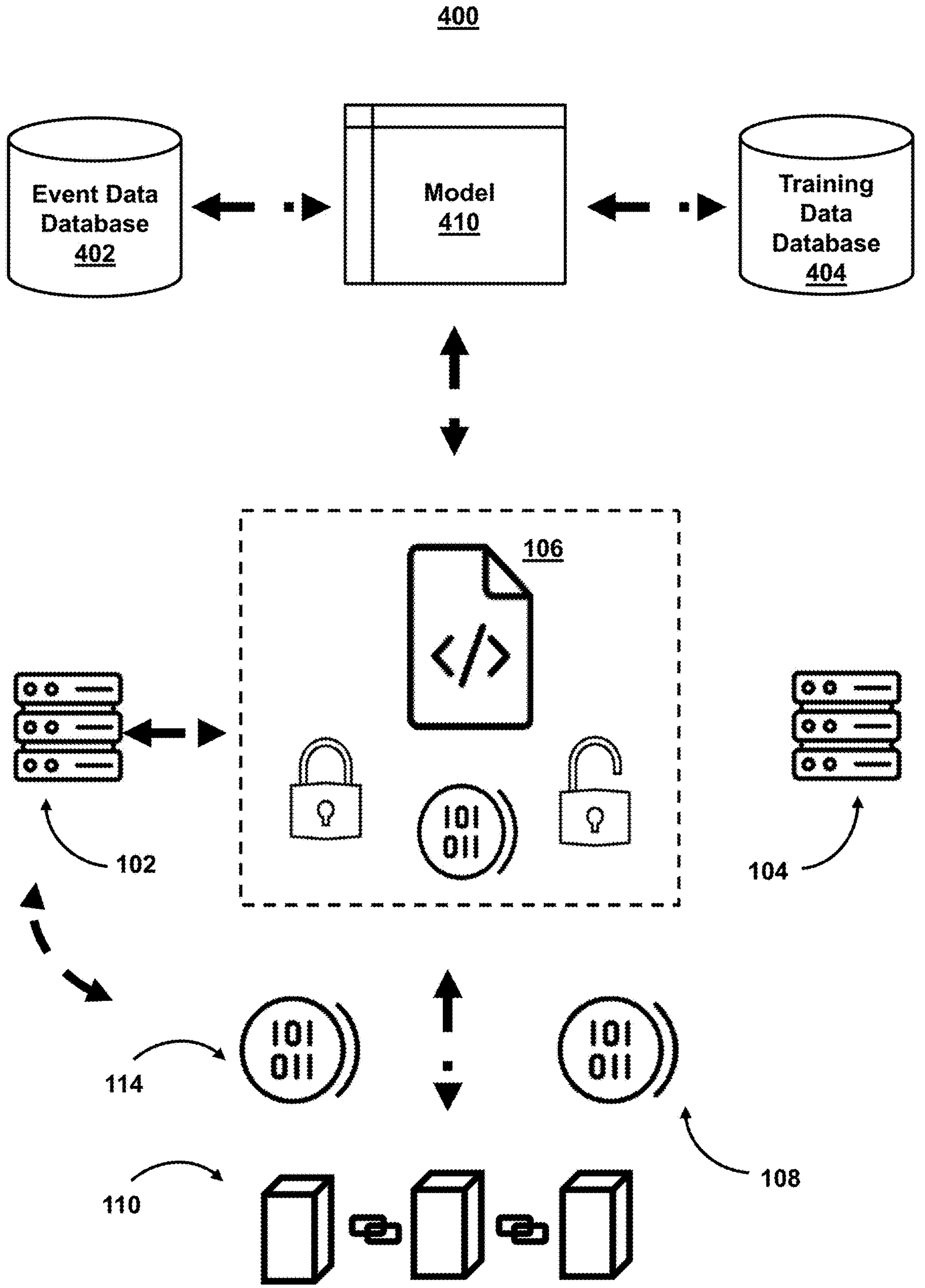
Figure 4C:
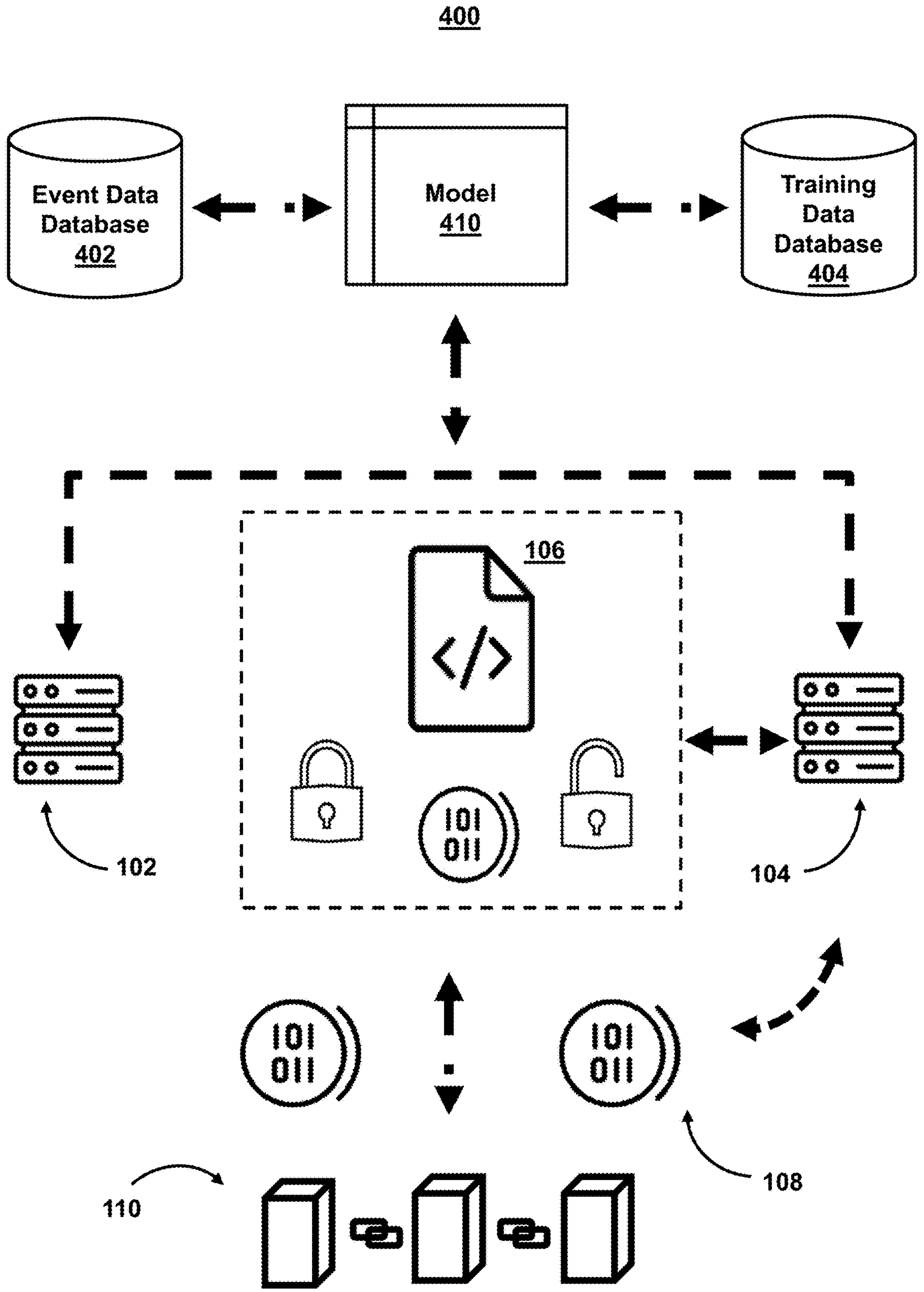

FIGS. 4A-4C show an illustrative diagram for managing resources leveraging one or more artificial intelligence models, in accordance with one or more embodiments. FIGS. 4A-4C show illustrative architectures for providing on-demand access to resources across global or cloud computer networks by using transformer models to estimate proxy resource capacities and leveraging the proxy resource capacities to enable on-demand access to the resources, in accordance with one or more embodiments. Some components of system 400 are the same or similar to those of system 100, described above with reference to FIGS. 1A-1C, and the previous descriptions of those components are applicable with respect to system 400. For example, system 400 includes a network between two resources: resource 102 and resource 104. As mentioned above, a resource may refer to any entity or component within the network that is made available and accessible for use by network users, applications, or devices. These resources can be hardware devices, software applications, or data that are shared across the network for various purposes. Hardware devices may include physical devices connected to the network that can be shared among multiple users or applications. Examples of hardware resources in a network include printers, scanners, servers, routers, switches, storage devices (like NAS-Network Attached Storage), and other peripheral devices. Software resources may be software applications, programs, or services made available for access and utilization over the network. This could include shared databases, file servers, web servers, email servers, application servers, and any other software-based services accessible to network users. Data resources refer to information or data stored and shared within the network. This could include shared files, documents, databases, multimedia content, and any other data that can be accessed and utilized by authorized users or applications within the network. Network resources are typically made accessible through a process called resource sharing or resource sharing protocols, which allow authorized users or devices to access, use, or modify these resources based on permissions and security configurations set by the network administrators. For instance, in a client-server network model, a server could host resources such as files or applications, and client devices can request access to these resources over the network.

Access control mechanisms, such as user authentication and permissions, regulate who can access specific resources and what actions they can perform on those resources. In some embodiments, the authentication process may be performed using one or more artificial intelligence models (e.g., model 410). For example, an access control model may be employed to grant or deny access to specific resources and/or authorization to perform actions on those specific resources. The access control model can refer to an artificial intelligence model trained to analyze authentication requests and determine whether to grant or deny access to specific resources and/or authorization to perform actions on those specific resources. For example, the authentication requests may include data that is analyzed by the access control model to verify that the request.

In some embodiments, resources may encompass a wide array of assets, tools, and components that are essential for conducting operations, delivering services, managing finances, and supporting a financial service firm's overall functioning. For example, a resource may comprise financial assets. Financial assets include cash reserves, investments, securities, loans, and other financial instruments held by the firm or managed on behalf of clients. For example, a resource corresponding to a user may comprise a bank account for that user.

In some embodiments, a resource may comprise a bank branch or other subdivision of the firm and/or an amount of liquidity for the bank branch or subdivision. For example, when a resource is a bank branch or other subdivision, the resource may go on and/or off-line based on the operating hours (or regulated trading hours) for the bank branch or subdivision. For example, banks and financial institutions often have specific business hours during which their systems and staff are available to process transactions. Outside these hours, certain banking functions, including fund transfers, may not be processed immediately. Some financial regulations or rules may limit or dictate the processing of certain types of transactions or transfers after regular business hours for security, compliance, or fraud prevention purposes. Banks may also risk management measures in place to detect and prevent fraudulent activities. Transactions initiated after hours may be flagged for additional scrutiny to ensure they are legitimate, which could cause delays.

In some embodiments, system 100 may illustrate one or more communications between resource 102 and resource 104 as managed by a platform application. For example, a platform application may be used to facilitate one or more blockchain actions (e.g., via self-executing program 106) to conduct the communications across computer network 112. In some embodiments, blockchain actions may also comprise actions related to a self-executing program (e.g., a smart contract). As referred to herein, a "self-executing program" comprises a program in which rules for execution are written into lines of code. The code and the rules contained therein may then exist across a distributed, decentralized blockchain network. For example, a self-executing program may comprise a contract in which the terms of the agreement between buyer and seller are written into lines of code. In some embodiments, the self-executing program may be a program in which rules for execution are written into lines of code that is executed in response to a trigger.

In some examples, the terms "capacity" and "availability" are used interchangeably.

System 400 of FIGS. 4A-4C illustrate example systems for providing on-demand access to resources across global or cloud computer networks by using transformer models to estimate proxy resource capacities and leveraging the proxy resource capacities to enable on-demand access to the resources. System 400 may include one or more similar components of system 100, and the previously provided description of those similar components apply to system 400.

In some embodiments, system 400 may be used to retrieve event data. The event data may represent a sequence of events associated with a first resource (e.g., first resource 102). In some examples, the first resource may be from a blockchain network (e.g., network 110 of FIGS. 4A-4C). Each event included in the sequence of events may correspond to a blockchain action. Each event included in the sequence of events may include a tokenized capacity of the first resource to perform the blockchain action.

The event data may be stored in event data database 402. Event data database 402 may store data associated with events associated with one or more resources (e.g., resources 102, 104). The event data stored in event data database 402 may include metadata to identify the various events represented by the data. For example, the metadata may include indications of a resource associated with a given event, a tokenized capacity of a given resource during the given event, and the like. In some embodiments, event data database 402 may be updated in real-time (i.e., as each event occurs) or in batches.

In some embodiments, each event of the sequence of events is stored and represented by a block on the blockchain network (e.g., network 110). For example, each event included in the sequence of events may correspond to a blockchain action. The blockchain action can be encoded in an action specific self-executing program (e.g., self-executing program 106). Each event may also include a corresponding tokenized capacity of the first resource (e.g., first resource 102) to perform the blockchain action.

In some examples, the action specific self-executing program (e.g., self-executing program 106) refers to a smart contract. As referred to herein, self-executing program 106 (or smart contract) may comprise a program with predefined terms (e.g., terms of an agreement between buyer and seller) written into the code of the program. Self-executing program 106 may be implemented on blockchain platforms, such as Ethereum, which allows for decentralized and automated execution of terms without the need for intermediaries. Self-executing program 106 may be programmed to automatically enforce, verify, and/or facilitate the negotiation or performance of a predefined term (e.g., contract), eliminating the need for a trusted third party. These programs may run on a blockchain, which is a distributed and immutable ledger that records all transactions across a network of computers.

As referred to herein, a tokenized capacity of a resource may correspond to assets available at a given resource (e.g., a digital account). The transfer of this may correspond to the assets being transferred from one resource to another. Tokenized capacity may refer to the representation or conversion of the availability of assets, resources, or services into digital tokens or cryptographic tokens on a blockchain or digital ledger. It involves using tokens as a representation or proof of ownership, access rights, or availability of certain resources within a decentralized network.

In some embodiments, the blockchain action corresponds to an off-chain action. As described herein, an "off-chain action" may refer to any activity or transaction that occurs outside the underlying blockchain network or protocol. Off-chain actions can take various forms, including off-chain transactions. These are transactions that occur outside the main blockchain network. They are conducted through secondary layers or channels and are settled or reconciled on-chain later. This helps in reducing congestion on the main chain and lowering transaction fees. Off-chain actions may also comprise off-chain computations. For example, complex computations or operations that are computationally expensive can be performed off-chain. For instance, certain computations or processes needed to support a decentralized application (DApp) might be handled off-chain to improve performance and reduce latency, with only the final outcome or necessary data being recorded on the blockchain.

In some embodiments, system 400 may be configured to receive a first request. The first request may be a request to perform a blockchain action. In particular, the blockchain action may be requested to be performed using the first resource (e.g., first resource 102). The blockchain action may be encoded using the action specific self-executing program (e.g., self-executing program 106).

In some embodiments, system 400 may be configured to provide the first request to one or more machine learning models (e.g., artificial intelligence model 410). In the illustrative example, artificial intelligence model 410 may be used to represent one or more machine learning models as a way to avoid obfuscation of components. System 400 may include multiple machine learning models, each of which may be configured to perform various tasks. For example, artificial intelligence model 410 may include one model that is trained to extract blockchain action data related to the blockchain action from a request. As an illustrative example, a natural language processing (NLP) model (e.g., artificial intelligence model 410) may be provided with the request. The NLP model may be trained to identify one or more keywords within the request and map the identified keywords to one or more request class keywords. The request class keywords refer to keywords that are associated with predefined actions, components, operations, etc. For example, a request including natural language text specifying an off-chain action to be performed can be recognized using the NLP model by detecting the presence of a specific keyword indicating that the context of the request relates to the off-chain action. As another example, artificial intelligence model 410 may include another model that is trained to determine a proxy tokenized capacity of a resource (e.g., first resource 102) based on event data associated with the resource and the received request.

In some embodiments, based on the extracted blockchain action data, the NLP model (e.g., artificial intelligence model 410) may classify the first request into one or more request classes. The request classes may include, for example, a first request class corresponding to on-chain actions, a second request class corresponding to off-chain actions, or other classes. The extracted blockchain data can be used to determine whether a given request is to be classified into the first request class or the second request class. In an illustrative example, system 400 may determine that the blockchain action corresponds to an off-chain action based on the first request being classified into the first request class.

In some embodiments, system 400 may be configured to determine a first tokenized capacity of the first resource (e.g., resource 102) from the first blockchain network (e.g., network 110). The first tokenized capacity may be determined based on the first request. In some examples, the action specific self-executing program (e.g., self-executing program 106) may be configured to determine the first tokenized capacity.

In some embodiments, system 400 may be configured to determine whether the first tokenized capacity of the first resource satisfies a condition. The condition may refer to a condition to be satisfied in order to cause the blockchain action to be performed. In some examples, the condition is encoded in the action specific self-executing program (e.g., self-executing program 106). If system 400 determines that the first tokenized amount satisfies the condition, then a request to complete the off-chain action corresponding to the blockchain action may be generated and transmitted. However, if system 400 determines that the first tokenized amount fails to satisfy the condition, system 400 may leverage other techniques to help facilitate execution of the blockchain action (i.e., by leveraging one or more machine learning models, such as artificial intelligence model 410, as detailed below) or prevent the blockchain action.

In some embodiments, in response to receiving the first request (e.g., a request to perform a blockchain action using first resource 102), system 400 may be configured to determine that a proxy tokenized capacity of the first resource (e.g., first resource 102) is to be used. In some examples, the determination that the proxy tokenized capacity is to be used may be based on the first request.

In some examples, determining that the proxy tokenized capacity is to be used may include providing the first request to a computing system associated with a third-party service provider. For example, the third-party service provider may be configured to provide proxy tokenized capacities of the first resource (e.g., first resource 102) based on the first request (e.g., a requesting user/client device, event data associated with a requesting account, etc.). In some examples, the first request may be a request to use a credit line of a third party (e.g., the third-party service provider). In response, the system may determine to use a proxy tokenized capacity provider by the third party. The proxy tokenized capacity may be a representation of client deposit or bank liability-in cash (1:1 value) in a tokenized database. The amount may be exchanged to fiat upon demand by client (e.g., settlement may by instantaneous). Alternatively, the proxy tokenized capacity may be based on the issuance of an instrument that represents the third party's obligation to pay in a tokenized database. This may not be a cash representation, but instead a willingness to pay when required conditions are met. The payment may also be instantaneous upon a successful request. In some embodiments, the third-party service provider may be configured to evaluate a risk score associated with the first request. For example, the risk score can indicate the liability of the client not replenishing the proxy tokenized capacity provided by the third-party service provider.

In some embodiments, if the risk score satisfies a condition for performing the blockchain action, then one or more actions may be performed. For example, the risk score satisfying the condition may include the risk score being less than a threshold risk score. Alternatively, if the risks core fails to satisfy the condition, then the one or more actions may be prevented from being performed. For example, if the risk score is greater than or equal to the threshold risk score, then the third-party service provider may be prevented from providing the proxy tokenized capacity.

In some embodiments, system 400 may be configured to provide tokenized capacities of the first resource (e.g., first resource 102) to the third-party service provider. For example, in response to providing the proxy tokenized capacity, based on the condition being satisfied, system 400 may provide a predefined tokenized capacity or a tokenized capacity commensurate with the proxy tokenized capacity to the third-party service provider.

In some embodiments, the event data and the first request may be provided (i.e., input) into to a machine learning model (e.g., artificial intelligence model 410) to obtain a proxy tokenized capacity of the first resource. Artificial intelligence model 410 may refer to a transformer model or other machine learning model. In some examples, instructions for determining whether the blockchain action satisfies the condition (or other conditions) may be stored by action specific self-executing program (e.g., self-executing program 106). In one or more embodiments, the event data and the first request may be input to the machine learning model (e.g., artificial intelligence model 410) in response to determining that the first tokenized capacity of the first resource (e.g., first resource 102) fails to satisfy the condition.

In some embodiments, system 400 may be configured to determine that the first tokenized capacity of the first resource fails to satisfy the condition. For example, system 400 may determine a pre-authorized tokenized capacity for performing the blockchain action. The pre-authorized tokenized capacity indicates a tokenized capacity of the first resource (e.g., first resource 102) needed to authorize execution of the blockchain action. If the first tokenized capacity of the first resource does not meet or exceed the pre-authorized tokenized capacity, then this can indicate that the first tokenized capacity of the first resource fails to satisfy the condition. In scenarios where the first tokenized capacity of the first resource is determined to not meet or exceed the pre-authorized tokenized capacity, system 400 may be configured to prevent the blockchain action from being performed. For example, system 400 may compare the pre-authorized tokenized capacity and the first tokenized capacity. If the pre-authorized tokenized capacity is less than the first tokenized capacity, then this can indicate to system 400 that the blockchain action is authorized to be performed. Alternatively, if the pre-authorized tokenized capacity is equal to or greater than the first tokenized capacity, then this can indicate to system 400 that the blockchain action is not authorized to be performed.

In some embodiments, the trained artificial intelligence model (e.g., artificial intelligence model 410) may be used to generate a representation of the event data and the first request. For example, the trained artificial intelligence model may comprise a transformer model including an encoder-decoder architecture. The event data and the first request may be provided to the encoder, which may generate an embedding representing the event data and the first request. In some examples, the first request may comprise a sequence of steps (e.g., a prompt, code, etc.) and the event data may comprise a sequence of events. A "sequence," as defined herein, refers to an ordered set of elements. For example, the sequence of letters in the English alphabet includes 26 elements (i.e., letters) in a specific order.

In some embodiments, the trained artificial intelligence model (e.g., artificial intelligence model 410) may be used to determine the proxy tokenized capacity of the first resource based on the representation. For example, representation may be provided to the decoder component of the transformer model, which can map the embedding to a candidate proxy tokenized capacity of the first resource.

In some embodiments, system 400 may be configured to train an artificial intelligence model to obtain artificial intelligence model 410 (i.e., a "trained" artificial intelligence model). System 400 may also update artificial intelligence model 410, retrain, or rebuild artificial intelligence model 410, or may train, retrain, rebuild other machine learning models. In some examples, the training may be performed offline prior to being used during production (i.e., post-deployment). In some examples, system 400 may continuously monitor the performance of artificial intelligence model 410 to determine whether the model's performance degrades over time and, if so, take the appropriate steps (e.g., re-train the model). In some cases, system 400 may also be configured to generate, retrieve, update, refine, or perform other operations, to obtain and maintain training data to be used to train artificial intelligence model 410. The training data may be stored in training data database 404. In some examples, the training data may be stored with metadata indicating, for example, a time that the training data was created and/or updated, a model type or types that the training data can be used for, or other information.

In some embodiments, system 400 can retrieve training data comprising a plurality of training samples associated with one or more resources from one or more blockchain networks. The training data may be retrieved from training data database 404. In some examples, each of the plurality of training samples may include a sequence of training events representing blockchain actions associated with a given resource from the one or more resources, a training request associated with a requested blockchain action to be performed using the first resource (e.g., first resource 102), a training tokenized capacity of the first resource, or other information. In some cases, the training samples may not include or may mask the training tokenized capacity of the first resource.

System 400 may be configured to train an artificial intelligence model to obtain the trained artificial intelligence model (e.g., artificial intelligence model 410). System 400 can use the retrieved training data to train the artificial intelligence model.

In one or more examples, system 400 can train the trained artificial intelligence model (e.g., artificial intelligence model 410) to determine proxy tokenized capacities of the first resource (e.g., first resource 102). The determined proxy tokenized capacities may be determined by the trained artificial intelligence model based on input data. For example, the input data may include event data associated with the resource, a submitted request (i.e., including a blockchain action to be executed), etc. The proxy tokenized capacities of the first resource may be used by system 400 to generate responses to received requests.

In some embodiments, the artificial intelligence model (e.g., artificial intelligence model 410), may be trained using a training process. For example, to train the artificial intelligence model, system 400 may be configured to select a training sample from the plurality of training samples included in the training data. Using the selected training sample, system 400 may be configured to provide the training sample to the artificial intelligence model (e.g., artificial intelligence model 410) to be trained. The artificial intelligence model may generate an embedding representing some or all of the training sample. For example, the embedding can represent the sequence of training events and the training request included by the selected training sample. Using the artificial intelligence model, system 400 can determine, or receive an indication of a determined, a candidate proxy tokenized capacity. The artificial intelligence model may determine the candidate proxy tokenized capacity based on the embedding. Upon determining the candidate proxy tokenized capacity, system 400 may be configured to adjust one or more parameters (e.g., weights, biases, etc.) of the artificial intelligence model to minimize a difference between the candidate proxy tokenized capacity and the training tokenized capacity. In some embodiments, one or more optimizers (e.g., Adam optimizer) may be used to execute an optimization process to determine the adjustments to the parameters.

In some embodiments, system 400 may execute a fine-tuning training component for training the artificial intelligence model (e.g., artificial intelligence model 410). For example, the training data previously mentioned to train the artificial intelligence model may include training samples each of which may include a sequence of training events representing blockchain actions associated with a given resource from the one or more resources, a training request associated with a requested blockchain action to be performed using the first resource (e.g., first resource 102), a training tokenized capacity of the first resource, or other information. System 400 may execute a subsequent training process to fine-tune the artificial intelligence model for a particular resource (e.g., first resource 102).

In some embodiments, the fine-tuning may include retrieving, using system 400, first-resource specific training data stored by training data database 404. The first-resource specific training data may include a plurality of first-resource training samples associated with the first resource (e.g., first resource 102). For example, each first-resource training sample may include a sequence of first-resource training events representing blockchain actions associated with the first resource, a previously received request associated with a requested blockchain action performed using the first resource, and a measured tokenized capacity of the first resource.

In some embodiments, system 400 may be configured to generate a trained first-resource specific artificial intelligence model (e.g., artificial intelligence model 410) on the trained artificial intelligence model (trained using the training data including training samples associated with one or more resources as opposed to just the first resource) and the first-resource specific training data. In some embodiments, the fine-tuning training step may be performed for each resource to obtain a plurality of resource-specific trained artificial intelligence models.

In some embodiments, system 400 may be configured to generate updated training data comprising the first request, the blockchain action, and the proxy tokenized capacity of the first resource (e.g., first resource 102). In some embodiments, system 400 may use the updated training data to update the trained artificial intelligence model (e.g., artificial intelligence model 410). In some examples, each corresponding request, blockchain action, and proxy tokenized capacity may form a new training sample. The training data may be updated with each new training sample upon completion of the corresponding blockchain action. In some cases, multiple new training samples may be batched and used to update the artificial intelligence model.

In some embodiments, system 400 may determine whether the proxy tokenized capacity of the first resource satisfies the condition for performing the blockchain action. If system 400 determines that the proxy tokenized capacity fails to satisfy the condition, system 400 may prevent the blockchain action from being executed. In some examples, this may include system 400 generating and sending notifications to first resource 102, second resource 104, network 110, or other components of system 400, that the blockchain action is not being executed.

In some embodiments, in response to determining that the proxy tokenized capacity of the first resource satisfies the condition for performing the blockchain action, system 400 may be configured to transmit a second request to complete the off-chain action. In some embodiments, system 400 may determine whether the off-chain action was completed. If not, system 400 may continue to monitor data exchanges to detect notification of the off-chain action's completion. System 400 can monitor for a predetermined amount of time (i.e., until a timeout) after which system 400 may prevent the blockchain action from being executed.

However, in response to system 400 determining that the off-chain action was completed, system 400 may be configured to execute, or cause execution of, the blockchain action. The blockchain action may be specified using the action specific self-executing program, which can encode the blockchain action. In some embodiments, execution of the blockchain action may cause system 400 to transfer, or cause the transfer of, the proxy tokenized capacity of the first resource (e.g., first resource 102) to a second resource (e.g., second resource 104).

In some embodiments, system 400 may be configured to generate an instruction to execute a second off-chain action. The second off-chain action may also be encoded by action specific self-executing program (e.g., self-executing program 106). In some examples, the second off-chain action may be configured to increase the first tokenized capacity of the first resource to the proxy tokenized capacity of the first resource. In some cases, the second off-chain action may cause an additional transfer of a tokenized capacity from first resource 102 to one or more other resources (e.g., one or more entities storing resources).

In some embodiments, as mentioned above, system 400 may include one or more machine learning models. To avoid obfuscation of FIGS. 4A-4C, the one or more machine learning models are represented by artificial intelligence model 410, and persons of ordinary skill in the art will recognize that a single instance of artificial intelligence model 410, as well as any of the other components depicted herein, is merely illustrative unless specifically indicated.

In some examples, the trained artificial intelligence model (e.g., artificial intelligence model 410) may include multiple artificial intelligence models. For example, artificial intelligence model 410 can represent a first artificial intelligence model and a second artificial intelligence. In these examples, the first artificial intelligence model may refer to the artificial intelligence model trained to determine the proxy tokenized capacity of the first resource.

In some embodiments, the second artificial intelligence model may be trained to generate a set of instructions to execute the off-chain action. The second request, for example, may include the set of instructions. The instructions may include computer code to effectuate the off-chain action. In some embodiments, the generated instructions may be encoded and included as an update to the action specific self-executing program (e.g., self-executing program 106).

In some embodiments, the second artificial intelligence may be trained to generate a set of instructions to effectuate transfer of the proxy tokenized capacity to the second resource. This set of instructions may refer to a second off-chain action to be performed. For example, the set of instructions may include an instruction to execute a second off-chain action to increase the first tokenized capacity of the first resource to the proxy tokenized capacity of the first resource. For instance, the second off-chain action may include transferring electronic resources from another resource (i.e., a third resource) to the first resource (e.g., first resource 102).

In some embodiments, system 400 may be configured to receive a message indicating that the transfer of the proxy tokenized capacity has been executed in accordance with the set of instructions. The message can indicate to system 400 that the first request has been completed.

In some embodiments, the second artificial intelligence model may be configured to generate the action specific self-executing program (e.g., self-executing program 106) based on one or more rules associated the first resource (e.g., first resource 102), the second resource (e.g., second resource 104), or other resources, or combinations thereof. For example, to generate the action specific self-executing program, the second artificial intelligence model may be trained to encode the one or more rules in the action specific self-executing program. The rules may include, for instance, the blockchain action, the condition, and the like.

In some embodiments, the second artificial intelligence model may be a generative artificial intelligence model. The generative artificial intelligence model may be trained to generate data based on input data. For example, generative artificial intelligence models may receive an input sequence of text requesting data, such as text, images, video, computer programs, etc., be generated based on the context of the text, and the generative artificial intelligence model can generate a predicted version of that data.

In some embodiments, system 400 may be configured to generate updated training data comprising the first request, the blockchain action, and the proxy tokenized capacity of the first resource. In some embodiments, system 400 may use the updated training data to update the trained artificial intelligence model (e.g., artificial intelligence model 410). In some examples, each corresponding request, blockchain action, and proxy tokenized capacity may form a new training sample. The training data may be updated with each new training sample upon completion of the corresponding blockchain action. In some cases, multiple new training samples may be batched and used to update the artificial intelligence model.

In some embodiments, an artificial intelligence model (e.g., artificial intelligence model 410) may be configured to generate the action specific self-executing program (e.g., self-executing program 106) based on one or more rules associated the first resource (e.g., first resource 102), the second resource (e.g., second resource 104), or other resources, or combinations thereof. For example, to generate the action specific self-executing program, the artificial intelligence model may be trained to encode the one or more rules in the action specific self-executing program. The rules may include, for instance, the blockchain action, the condition, and the like.

In some embodiments, the artificial intelligence model may be a generative artificial intelligence model. The generative artificial intelligence model may be trained to generate data based on input data. For example, generative artificial intelligence model may receive an input sequence of text requesting data, such as text, images, video, computer programs, etc., be generated based on the context of the text, and the generative artificial intelligence model can generate a predicted version of that data. In some examples, the generative artificial intelligence model may be a transformer model. In the context of natural language processing, the transformer model can encode each term in a text sequence into a token and use the tokens to generate an attention map. The attention map describes the relationships of tokens to one another. The transformer model can learn which tokens are more important to one another, indicating contextual information useable to understand a meaning of the text, based on the attention scores included in the attention mapping.

In some embodiments, the generative artificial intelligence model may be trained to generate the self-executing program (e.g., self-executing program 106). The training process for training the generative artificial intelligence model may include obtaining generative training data. The generative training data may include a plurality of generative training samples. In some embodiments, each generative training sample a sample label and a sample feature set. The generative model may be trained to predict the sample feature set based on the sample label. In some examples, one or more rules may also be employed to predict the sample feature set.

In some examples, the generative artificial intelligence model (e.g., model 410) may be implemented using a variational autoencoder, a generative adversarial network, transformer models, and the like. As an illustrative example, a generative adversarial network may include two artificial intelligence networks (e.g., neural networks) trained together. The two artificial intelligence networks may include a generator and a discriminator. The generators may be configured to generate artificial samples based on an input (e.g., a prompt, a label, an input feature vector, a random input vector, etc.). The generated artificial samples may be provided, along with real samples, to the discriminator. The discriminator may be tasks with determining whether a given sample is a real sample or a generated artificial sample. The discriminator and the generator can then have their parameters (i.e., weights, biases) updated based on the results of the discriminator in differentiating between real samples and generated artificial samples. By learning to differentiate between real samples and generated artificial samples, the generator can learn to generate artificial samples that are harder for the discriminator to differentiate, and the discriminator can learn to better identify artificial samples from real samples.

In some embodiments, the platform application may be used to manage the availability of devices in a computer network (e.g., a "platform management application"). This type of platform application is designed to monitor, control, and manage various devices and components within a network to ensure their availability, performance, and security. The platform application may automatically identify and map devices present on the network, including computers, routers, switches, servers, printers, and other network-connected devices. The platform application may constantly monitor the status and performance metrics (such as bandwidth usage, CPU usage, memory, etc.) of network devices to identify any abnormalities or performance bottlenecks.

In some embodiments, platform application (e.g., the platform management application) may include, or implement, one or more machine learning models (e.g., artificial intelligence model 410) to determine abnormalities in the monitored status and performance metrics. For example, an anomaly detection model may be employed to detect anomalies within monitored bandwidth usage of a network device. In this example, the anomaly detection model may continually check a current bandwidth usage level of the monitored network device. If the anomaly detection model determines that the current bandwidth usage level exceeds a threshold bandwidth usage level, or satisfies another condition, then the anomaly detection model may output a flag indicating that an anomaly was detected. The flag may also include specifics about the detected anomaly (e.g., a time of the anomaly, a magnitude of the anomaly, etc.). In some examples, the flag may also serve as a trigger to start one or more other processes or analysis (e.g., causing one or more additional artificial intelligence models to be executed). As an example, the anomaly detection model may comprise a classifier, such as a support vector machine, however other model architectures may be used.

The platform application may generate alerts or notifications when certain predefined thresholds are breached or when anomalies in network behavior are detected (e.g., using the anomaly detection model). This helps in proactive issue resolution and prevents network downtime. The platform application may allow administrators to centrally manage and update device configurations, ensuring consistency and compliance with network policies and standards. The platform application may monitor the network for security threats, unauthorized access attempts, malware, and other vulnerabilities, providing insights into potential security breaches. For example, an artificial intelligence model (e.g., model 410) may analyze the data streams to detect potential security breaches by determining a similarity between a potential security breach and one or more previously detected security breaches (i.e., confirmed true security breaching events).

In some embodiments, system 400 (i.e., via the platform management application) may analyze a received user request and identify the nature of the action requested. System 400 can parse the request to understand the details of the requested off-chain action, such as its purpose, parameters, and requirements. System 400, through its logic or predefined mapping rules, can identify that the requested off-chain action has a corresponding action or operation that needs to be executed on the blockchain. This mapping could be based on predetermined correlations between off-chain and on-chain actions within the system's architecture or business logic.

In some embodiments, this mapping may also be based on one or more artificial intelligence models. For example, system 400 may be configured to provide the first request to one or more machine learning models (e.g., artificial intelligence model 410). In the illustrative example, artificial intelligence model 410 of FIGS. 4A-4C may be used to represent one or more machine learning models as a way to avoid obfuscation of components. In some cases, system 400 may include multiple machine learning models, each of which may be configured to perform various tasks. For example, artificial intelligence model 410 may include an artificial intelligence model that is trained to extract blockchain action data related to the blockchain action from a request. As an illustrative example, artificial intelligence model 410 may include a natural language processing (NLP) model, which may be provided with the request. The NLP model may be trained to identify one or more keywords within the request and map the identified keywords to one or more request class keywords. The request class keywords refer to keywords that are associated with predefined actions, components, operations, etc. For example, a request including natural language text specifying the off-chain action to be performed may be recognized using the NLP model. The NLP model can detect the presence of a specific keyword indicating that the context of the request relates to the off-chain action. As another example, artificial intelligence model 410 may be an artificial intelligence model trained to determine a proxy tokenized capacity of a resource (e.g., first resource 102) based on event data associated with the resource and the received request.

In some embodiments, based on the extracted blockchain action data, the artificial intelligence models (e.g., artificial intelligence model 410, which may include an NLP model) may classify the first request into one or more request classes. The request classes may include, for example, a first request class corresponding to on-chain actions, a second request class corresponding to off-chain actions, or other classes. The extracted blockchain data can be used to determine whether a given request is to be classified into the first request class or the second request class. In an illustrative example, system 400 may determine that the blockchain action corresponds to an off-chain action based on the first request being classified into the first request class.

System 400 may leverage one or more artificial intelligence models (e.g., artificial intelligence model 410) facilitate the performance of an off-chain action. As described herein, an "off-chain action" may refer to any activity or transaction that occurs outside the underlying blockchain network or protocol. Off-chain actions can take various forms, including off-chain transactions. These are transactions that occur outside the main blockchain network.

In some embodiments, system 400 may be configured to provide a request to one or more artificial intelligence models (e.g., artificial intelligence model 410). As an illustrative example, artificial intelligence model 410 may include a natural language processing (NLP) model, which may be provided with the request. The NLP model may be trained to identify one or more keywords within the request and map the identified keywords to one or more request class keywords. The request class keywords refer to keywords that are associated with predefined actions, components, operations, etc. For example, a request including natural language text specifying the off-chain action to be performed be recognized using the NLP model by detecting the presence of a specific keyword indicating that the context of the request relates to the off-chain action. As another example, artificial intelligence model 410 may include another model that is trained to determine a proxy tokenized capacity of a resource (e.g., first resource 102) based on event data associated with the resource and the received request.

In some embodiments, based on the extracted blockchain action data, the artificial intelligence models (e.g., the NLP model) may classify the first request into one or more request classes. The request classes may include, for example, a first request class corresponding to on-chain actions, a second request class corresponding to off-chain actions, or other classes. The extracted blockchain data can be used to determine whether a given request is to be classified into the first request class or the second request class.

In some embodiments, system 400 may determine one or more characteristics of availability in one or more resources (e.g., resources 102, 104) and can select a cryptographically secure digital asset, from a plurality of cryptographically secure digital assets, based on the characteristics. For example, system 400 (or self-executing program 106) may determine a condition for performing the first blockchain action and select a first cryptographically secure digital asset, from a plurality of cryptographically secure digital assets, based on the condition. For example, the condition may indicate a requirement for a cryptographically secure digital asset as recorded in a predetermined digital log corresponding to the first resource (e.g., first resource 102). For example, the self-executing program condition may determine a requirement for a first cryptographically secure digital asset, as recorded in a predetermined digital log corresponding to a resource, involves encoding specific criteria or rules within the self-executing program's code to validate the possession or existence of the digital asset before executing certain actions or operations.

As mentioned previously, a characteristic of availability may comprise any attribute that distinguishes the availability (or availability on a resource) from other availability (or availability on another resource). In some embodiments, characteristics of availability in resources within a computer network may refer to attributes or factors that define the accessibility, reliability, and continuity of these resources. For example, in embodiments describing the transfer of availability, the availability may be transferred by a change (or transfer) of a characteristic of the availability being transferred.

For example, a characteristic may refer to uptime and reliability as availability is associated with the ability of resources to remain operational and accessible over time without unexpected interruptions. High availability implies minimal downtime and consistent reliability. In another example, a characteristic may refer to accessibility. Available resources should be easily accessible and reachable by users or systems when needed. This includes factors such as network connectivity, response time, and the absence of barriers preventing access. In another example, a characteristic may refer to redundancy and fault tolerance. Systems designed with redundancy have backup mechanisms or duplicate resources to ensure continuous operation even if one component fails. Fault-tolerant systems can detect and recover from failures without significant impact on availability. In another example, a characteristic may refer to resilience to failures. Availability may be linked to a system's resilience against failures caused by hardware malfunctions, software errors, network issues, or other disruptions. Systems designed for high availability can withstand failures and maintain functionality. In another example, a characteristic may refer to scalability and capacity planning. Availability considerations involve the ability to scale resources to meet increasing demand without compromising performance or accessibility. Proper capacity planning ensures resources are available as needed. In another example, a characteristic may refer to monitoring and maintenance. Continuous monitoring, proactive maintenance, and timely interventions play a crucial role in ensuring resource availability. Monitoring tools help detect issues early, allowing for prompt resolution and minimizing downtime. In another example, a characteristic may refer to recovery and disaster preparedness. Availability includes having recovery strategies and disaster preparedness plans in place. These plans help restore services quickly after unexpected events, such as natural disasters or cyber-attacks. In another example, a characteristic may refer to service level agreements (SLAs) characteristics. Defining and adhering to SLAs regarding availability metrics, such as uptime percentage, response time, and maintenance windows, is essential in ensuring commitments to users or customers.

In another example, a characteristic may refer to geographical distribution and load balancing. Distribution of resources across multiple geographical locations and load balancing techniques contribute to availability by ensuring even distribution of workload and minimizing the impact of localized disruptions. In another example, a characteristic may refer to security measures. Availability is linked to security practices that protect resources from unauthorized access, cyber threats, or malicious attacks. Security measures prevent service disruptions caused by security breaches. In another example, a characteristic may refer to documentation and recovery procedures. Maintaining comprehensive documentation and well-defined recovery procedures helps restore services efficiently in case of outages or failures, minimizing the impact on availability.

In some embodiments, a characteristic of availability may refer to a characteristic of a good, service, and/or medium of exchange (e.g., money). The characteristics of currency, which is issued by governments and central banks. For example, a characteristic may refer to an issuing authority (e.g., a recognized government or central monetary authority within a country), legal tender (e.g., whether it is authorized by the government for settling debts, transactions, and payments within the country's borders), denomination and/or amount, physical form (e.g., banknotes and coins), type (e.g., fiat, commodity-backed), security features, exchange rate, stability, regulation, etc.

Selecting a cryptographically secure digital asset from a plurality of such assets based on characteristics involves a process that considers various attributes or features associated with these assets. The system may identify the specific characteristics or attributes that are essential for the system's purpose or requirements. These criteria could include factors such as security features, transaction speed, scalability, decentralization, consensus mechanism, token standard (e.g., ERC-20, ERC-721), utility, or network adoption. The system may obtain information and data about the plurality of cryptographically secure digital assets under consideration. This information may include technical specifications, whitepapers, historical performance, market data, developer community, security audits, and use case relevance. The system may evaluate and compare the characteristics of each digital asset against the predefined selection criteria. Assess how well each asset aligns with the system's requirements, considering factors like security, functionality, transaction costs, liquidity, governance, or regulatory compliance. The system may apply a weighted scoring system or ranking mechanism to assign importance or priority to different characteristics based on their relevance to the system's goals. For example, security might have higher weightage compared to transaction speed. The system may conduct both quantitative analysis (e.g., metrics, performance data) and qualitative analysis (e.g., community support, development activity) to comprehensively assess the assets' characteristics. In some embodiments, the system may employ decision models or algorithms that factor in the weighted criteria and analysis to generate a scoring system or rank the assets based on their suitability for the system's requirements.

As an example, system 400 may leverage one or more artificial intelligence models (e.g., artificial intelligence model 410) to determine one or more characteristics of availability in one or more resources (e.g., resources 102, 104). For example, a characteristic of availability may refer to network connectivity of system 400. In some embodiments, system 400 can monitor network connectivity metrics (e.g., bandwidth, resource consumption, etc.) over time to obtain time series data representing the change of network connective over time. The time series data may be input to an artificial intelligence model (e.g., artificial intelligence model 410), which can extract the characteristics of availability from the network connectivity time series data. In some embodiments, the artificial intelligence model may be a transformer model including an encoder-decoder architecture. In this example, the encoder may receive the time series data and generate an embedding or other compressed encoding representing the time series data. System 400 can select a cryptographically secure digital asset, from a plurality of cryptographically secure digital assets, based on the determined characteristics. For example, the embedding may be passed to the decoder component of the transformer model, which can map the embedding to a particular cryptographically secure digital asset.

As an example, with reference to FIG. 4B, system 400 may receive, at a platform application, a first user request to perform a first off-chain action. For example, the first off-chain action may represent resource 102 (e.g., a buyer) creating a self-executing program (e.g., self-executing program 106). The system may determine a first blockchain action that corresponds to the first off-chain action. The request (e.g., a computer request) may refer to a communication or a query made by a computer or a software application to another computer, server, and/or device on a network. System 400 may determine, at the first action specific self-executing program (e.g., self-executing program 106), a first condition for performing the first blockchain action, wherein the first condition is encoded in the first action specific self-executing program. For example, the first condition may comprise a required amount of available digital assets (or cash or other assets) at a given resource.

As mentioned above, system 400 may include multiple artificial intelligence models, each of which may be configured to perform various tasks. For example, artificial intelligence model 410 may be trained to extract blockchain action data related to the blockchain action from the request. As an illustrative example, artificial intelligence model 410 may include a natural language processing (NLP) model, which may be provided with the request. The NLP model may be trained to identify one or more keywords within the request and map the identified keywords to one or more request class keywords. The request class keywords refer to keywords that are associated with predefined actions, components, operations, etc. For example, a request including natural language text specifying the off-chain action to be performed be recognized using the NLP model by detecting the presence of a specific keyword indicating that the context of the request relates to the off-chain action. As another example, artificial intelligence model 410 may include another model that is trained to determine a proxy tokenized capacity of a resource (e.g., first resource 102) based on event data associated with the resource and the received request.

In some embodiments, based on the extracted blockchain action data, the artificial intelligence models (e.g., the NLP model) may classify the first request into one or more request classes. The request classes may include, for example, a first request class corresponding to on-chain actions, a second request class corresponding to off-chain actions, or other classes. The extracted blockchain data can be used to determine whether a given request is to be classified into the first request class or the second request class. In an illustrative example, system 400 may determine that the blockchain action corresponds to an off-chain action based on the first request being classified into the first request class.

Conditions in a self-executing program are encoded using programming languages and specific syntax within the code of the self-executing program. Self-executing programs are typically written in specialized programming languages, such as Solidity for Ethereum or Chaincode for Hyperledger Fabric, and these languages have their syntax and structures to encode conditions. In response to a user request, system 400 may write self-executing programs using programming languages specifically designed for blockchain platforms. They use the language's syntax and logic to encode conditions within the contract's code. Programming languages used for self-executing programs offer conditional statements (if, else if, else) that allow developers to specify conditions and define the actions or behaviors to be executed based on the evaluation of these conditions. The user request may define the logic, rules, and parameters for conditions within the contract's code. This includes specifying trigger events, input variables, comparison operations, and logical operators to create the conditions. Some self-executing program languages allow the creation of event handlers that can detect external triggers or changes in the blockchain state. These event handlers can be associated with specific conditions to execute actions when triggered.

As another example, with reference to FIG. 4C, system 400 may determine, by the first action specific self-executing program (e.g., self-executing program 106), whether to perform the first blockchain action based on comparing the first condition to the first tokenized capacity. For example, system 400 may determine whether or not to execute the self-executing program. System 400 may make this determination based on one or more criteria.

As shown in FIG. 4C, system 400 may determine whether conditions of the self-executing program have been completed. In some embodiments, in response to determining to perform the first blockchain action, system 400 may transmit a second request to complete the first off-chain action. For example, system 400 may determine whether a seller delivers services or goods to buyer in accordance with the self-executing program terms and conditions. In such cases, system 400 may query a buyer and/or seller or request other information of an off-chain action.

System 400 may execute the first blockchain action, by the first action specific self-executing program, based on determining that the first off-chain action is completed, wherein executing the first blockchain action causes the first tokenized capacity of the first resource to be transferred to a second resource.

System 400 may receive, at the platform application, a confirmation of the first blockchain action being executed. A confirmation of a blockchain action being executed may refer to the acknowledgment or verification that a specific transaction or operation has been successfully processed and added to the blockchain.

Figure 5:
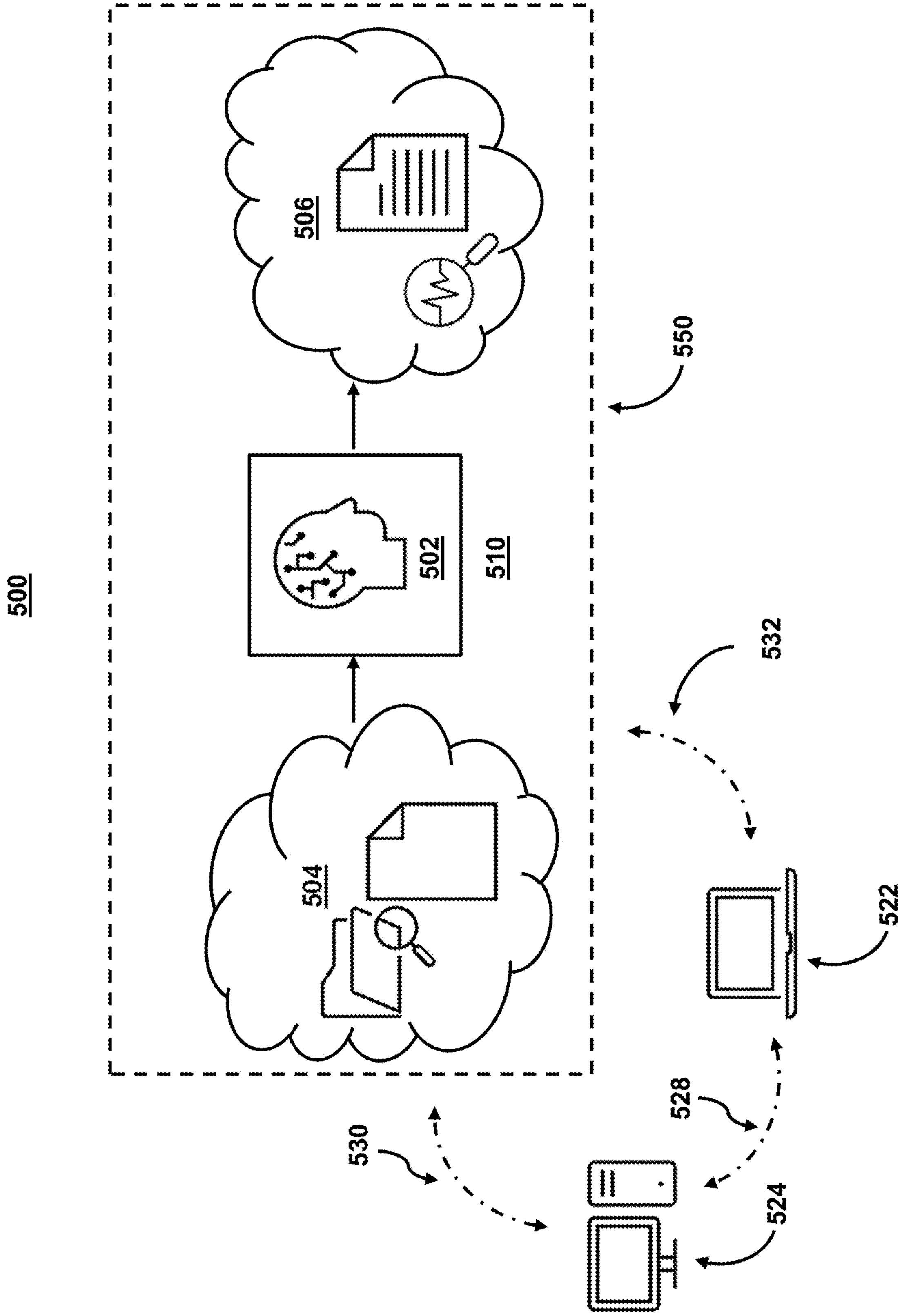
FIG. 5 shows illustrative components for a system used to facilitate user-specific data transfers to provide task-related context to a user, in accordance with one or more embodiments.

FIG. 5 shows illustrative components for a system used to facilitate user-specific data transfers to provide task-related context to a user, in accordance with one or more embodiments. For example, FIG. 5 may show illustrative components for facilitating user-specific data transfers to provide task-related context to a user. As shown in FIG. 5, system 500 may include mobile device 522 and user terminal 524. While shown as a smartphone and personal computer, respectively, in FIG. 5, it should be noted that mobile device 522 and user terminal 524 may be any computing device, including, but not limited to, a laptop computer, a tablet computer, a hand-held computer, and other computer equipment (e.g., a server), including "smart," wireless, wearable, and/or mobile devices. FIG. 5 also includes cloud components 510. Cloud components 510 may alternatively be any computing device as described above, and may include any type of mobile terminal, fixed terminal, or other device. For example, cloud components 510 may be implemented as a cloud computing system and may feature one or more component devices. It should also be noted that system 500 is not limited to three devices. Users may, for instance, utilize one or more devices to interact with one another, one or more servers, or other components of system 500. It should be noted, that, while one or more operations are described herein as being performed by particular components of system 500, these operations may, in some embodiments, be performed by other components of system 500. As an example, while one or more operations are described herein as being performed by components of mobile device 522, these operations may, in some embodiments, be performed by components of cloud components 510. In some embodiments, the various computers and systems described herein may include one or more computing devices that are programmed to perform the described functions. Additionally, or alternatively, multiple users may interact with system 500 and/or one or more components of system 500. For example, in one embodiment, a first user and a second user may interact with system 500 using two different components.

With respect to the components of mobile device 522, user terminal 524, and cloud components 510, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 5, both mobile device 522 and user terminal 524 include a display upon which to display data (e.g., conversational response, queries, and/or notifications).

Additionally, as mobile device 522 and user terminal 524 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 500 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 5 also includes communication paths 528, 530, and 532. Communication paths 528, 530, and 532 may include the Internet, a mobile phone network, a mobile voice or data network (e.g., a 5G or LTE network), a cable network, a public switched telephone network, or other types of communications networks or combinations of communications networks. Communication paths 528, 530, and 532 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 510 may include model 502, such as artificial intelligence model 410, which may be a machine learning model, artificial intelligence model, etc. (which may be referred collectively as "models" herein). Model 502 may take inputs 504 and provide outputs 506. The inputs may include multiple datasets, such as a training dataset and a test dataset. Each of the plurality of datasets (e.g., inputs 504) may include data subsets related to user data, predicted forecasts and/or errors, and/or actual forecasts and/or errors. In some embodiments, outputs 506 may be fed back to model 502 as input to train model 502 (e.g., alone or in conjunction with user indications of the accuracy of outputs 506, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a class of computing task to be executed).

In a variety of embodiments, model 502 may update its configurations (e.g., weights, biases, or other parameters) based on the assessment of its prediction (e.g., outputs 506) and reference feedback information (e.g., user indication of accuracy, reference labels, or other information). In a variety of embodiments, where model 502 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 502 may be trained to generate better predictions.

In some embodiments, model 502 may include an artificial neural network. In such embodiments, model 502 may include an input layer and one or more hidden layers. Each neural unit of model 502 may be connected with many other neural units of model 502. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 502 may be self-learning and trained, rather than explicitly programmed, and can perform significantly better in certain areas of problem solving, as compared to traditional computer programs. During training, an output layer of model 502 may correspond to a classification of model 502, and an input known to correspond to that classification may be input into an input layer of model 502 during training. During testing, an input without a known classification may be input into the input layer, and a determined classification may be output.

In some embodiments, model 502 may include multiple layers (e.g., where a signal path traverses from front layers to back layers). In some embodiments, back propagation techniques may be utilized by model 502 where forward stimulation is used to reset weights on the "front" neural units. In some embodiments, stimulation and inhibition for model 502 may be more free flowing, with connections interacting in a more chaotic and complex fashion. During testing, an output layer of model 502 may indicate whether a given input corresponds to a classification of model 502 (e.g., a data item is relevant to the computing task to be executed).

In some embodiments, the model (e.g., model 502) may automatically perform actions based on outputs 506. In some embodiments, the model (e.g., model 502) may not perform any actions. The output of the model (e.g., model 502) may be used to further update the model by generating updating training data including the input request and the predicted classification (i.e., relevant/not relevant).

The type of artificial intelligence model selected for model 502 may include, but is not limited to (which is not to suggest that any other list is limiting), any of the following: Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAD)), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Convolutional Neural Network (CNN), Deep Metric Learning, Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC), Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence (evolutionary algorithms, etc.), Computer Vision (CV), Natural Language Processing (NLP), Recommender Systems, Reinforcement Learning, Graphical Models, or separable convolutions (e.g., depth-separable convolutions, spatial separable convolutions, etc.), Transformer Models, Large Language Models (LLMs), or others.

System 500 also includes API layer 550. API layer 550 may allow the system to generate summaries across different devices. In some embodiments, API layer 550 may be implemented on mobile device 522 or user terminal 524. Alternatively, or additionally, API layer 550 may reside on one or more of cloud components 510. API layer 550 (which may be A REST or Web services API layer) may provide a decoupled interface to data and/or functionality of one or more applications. API layer 550 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 550 may use various architectural arrangements. For example, system 500 may be partially based on API layer 550, such that there is strong adoption of SOAP and RESTful Web-services, using resources like Service Repository and Developer Portal, but with low governance, standardization, and separation of concerns. Alternatively, system 500 may be fully based on API layer 550, such that separation of concerns between layers like API layer 550, services, and applications are in place.

In some embodiments, the system architecture may use a microservice approach. Such systems may use two types of layers: Front-End Layer and Back-End Layer where microservices reside. In this kind of architecture, the role of the API layer 550 may provide integration between Front-End and Back-End. In such cases, API layer 550 may use RESTful APIs (exposition to front-end or even communication between microservices). API layer 550 may use AMQP (e.g., Kafka, RabbitMQ, etc.). API layer 550 may use incipient usage of new communications protocols such as gRPC, Thrift, etc.

In some embodiments, the system architecture may use an open API approach. In such cases, API layer 550 may use commercial or open-source API Platforms and their modules. API layer 550 may use a developer portal. API layer 550 may use strong security constraints applying WAF and DDOS protection, and API layer 550 may use RESTful APIs as standard for external integration.

Figure 6:
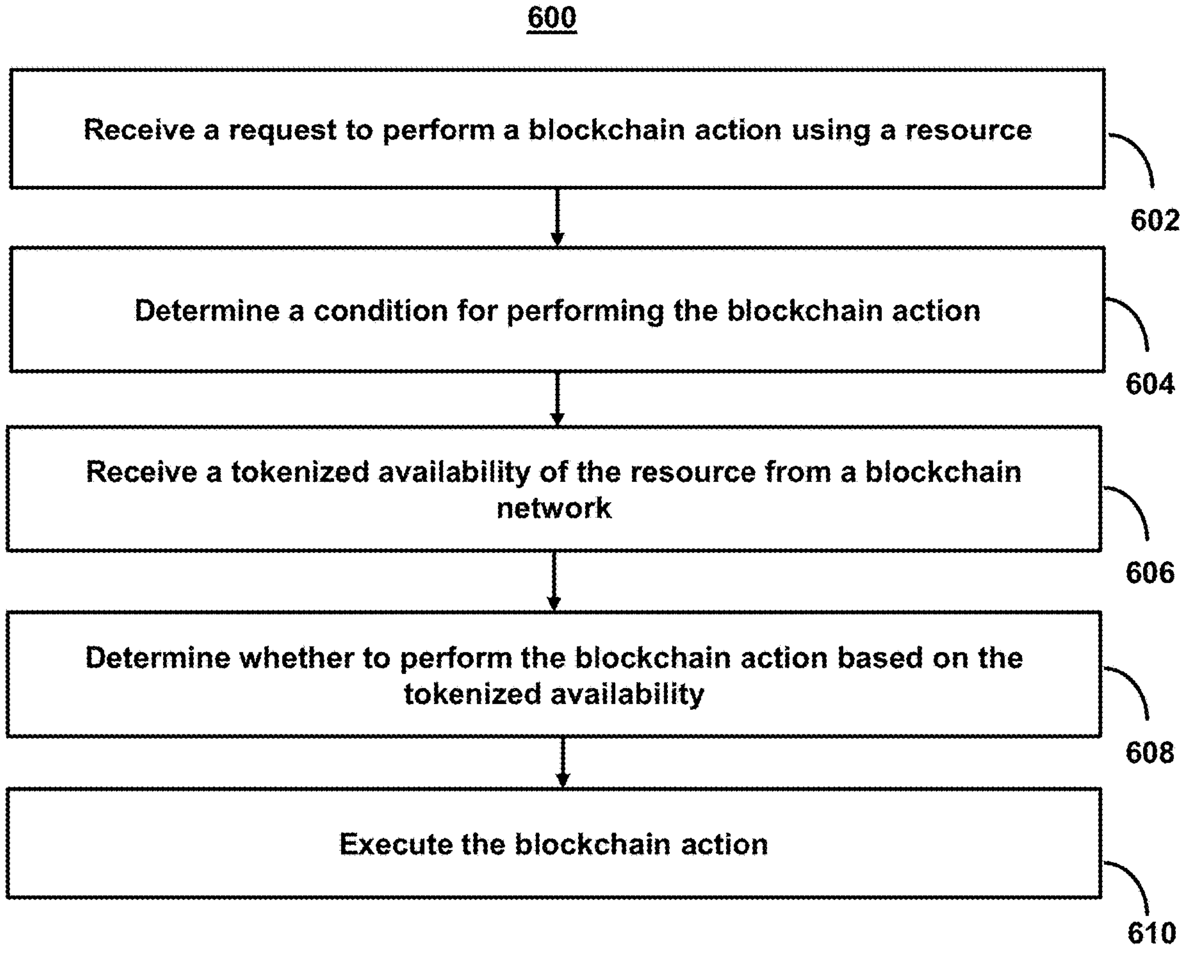
FIG. 6 shows a flowchart of the steps involved in determining availability of resources across global or cloud computer networks, in accordance with one or more embodiments.

FIG. 6 shows a flowchart of the steps involved in determining availability of resources across global or cloud computer networks, in accordance with one or more embodiments. For example, the system may use process 600 (e.g., as implemented on one or more system components described above) in order to determine availability of resources across global or cloud computer networks while mitigating issues related to providing services with unstable resources At step 602, process 600 (e.g., using one or more components described above) receives a request to perform a blockchain action using a resource. For example, the system may receive a first request, at a first action specific self-executing program, to perform a first blockchain action using a first resource, wherein the first blockchain action is encoded in the first action specific self-executing program.

In some embodiments, encoding the first blockchain action in the first action specific self-executing program may comprise the system (e.g., a self-executing program) receiving the first resource as a first statement in the first action specific self-executing program. A statement refers to a line or a set of instructions written in the code of the self-executing program. These statements represent specific actions, commands, or operations that the self-executing program is programmed to execute when certain conditions are met. Statements are fundamental building blocks of smart contract code. They are written using programming languages specific to the blockchain platform (e.g., Solidity for Ethereum, Chaincode for Hyperledger Fabric) and define the logic and operations of the self-executing program. Statements consist of commands, functions, or instructions that direct the smart contract on how to process data, interact with the blockchain network, manipulate variables, perform calculations, handle transactions, or execute conditional operations. Statements can include conditional structures (such as if-else statements), loops, variable assignments, function calls, event triggers, and other programming constructs that control the flow of execution within the self-executing program.

Additionally, or alternatively, the system may receive a first logic in the first action specific self-executing program that determines the second resource upon execution of the first action specific self-executing program. Logic refers to the set of rules, conditions, and instructions encoded within the self-executing program's code that govern its behavior, decision-making process, and execution flow. It encompasses the logical operations, conditional statements, and procedural instructions that define how the self-executing program operates and responds to various inputs or conditions.

In some embodiments, encoding the first blockchain action in the first action specific self-executing program may comprise the system receiving a first value for satisfying the first condition. For example, the first value for satisfying the first condition may incorporate information from external data sources, and conditions may rely on data retrieved from these sources to trigger actions. For instance, a weather-based insurance smart contract may pay out based on weather data obtained from an oracle. As another example, conditions might specify that a certain number of participants (e.g., indicated by the value) need to approve an action or that a certain amount of tokens needs to be accumulated before an action is executed. Additionally, or alternatively, the system may receive a first time for satisfying a second condition. For example, the second value may be a particular action that executes the self-executing program only after a specific date, time, or a defined duration has elapsed.

At step 604, process 600 (e.g., using one or more components described above) determines a condition for performing the blockchain action. For example, the system may determine, at the first action specific self-executing program, a first condition for performing the first blockchain action, wherein the first condition is encoded in the first action specific self-executing program.

At step 606, process 600 (e.g., using one or more components described above) receives a tokenized capacity of the resource from a blockchain network. For example, the system may receive, by the first action specific self-executing program, a first tokenized capacity of the first resource from a first blockchain network.

At step 608, process 600 (e.g., using one or more components described above) determines whether to perform the blockchain action based on the tokenized capacity. For example, the system may determine, by the first action specific self-executing program, whether to perform the first blockchain action based on comparing the first condition to the first tokenized capacity.

In some embodiments, the system (e.g., system 100) may determine whether to perform the first blockchain action is based on comparing the first condition to the first tokenized capacity, determining a first actual availability for a first resource in a first computer network based on the first tokenized capacity, and determining that the first condition corresponds to the first actual availability. For example, the system may define a specific condition or set of criteria that needs to be met for triggering a blockchain action. This condition can be related to resource availability, a specific value threshold, time-based parameters, or any other predefined rule. The system may maintain tokenized representations or digital tokens that signify the availability or capacity of resources within the computer network. These tokens could represent the available resources or their capacity in a digital form. The system may compare the condition set for the blockchain action with the tokenized capacity. It checks if the condition aligns with the tokenized representation of resource availability in the network. The system may utilize the tokenized capacity to derive or determine the corresponding actual availability of the resource within the computer network. This involves a process where tokenized capacity is converted or mapped to reflect the real-time or current status of the resource. The system may then compare the condition specified for the blockchain action with the determined actual availability of the resource. It verifies whether the condition matches or corresponds to the verified real-time availability status of the resource within the network. Based on the comparison between the condition, tokenized capacity, and actual availability, the system may make a decision regarding whether the condition aligns with the current state of the resource. If the condition matches the actual availability, the system proceeds to perform the blockchain action. If the comparison confirms that the condition corresponds to the verified actual availability, the system triggers the specified blockchain action, such as initiating a transaction, updating a smart contract, or executing a programmed function on the blockchain. The system may record the executed action on the blockchain and maintains a log or record of the process, documenting the correlation between the condition, tokenized capacity, and actual resource availability for auditing or future reference.

In some embodiments, determining whether to perform the first blockchain action may be based on transmitting a second user request to complete a first off-chain action and determining that the first off-chain action is completed. For example, oracles are entities or services that provide off-chain data or trigger off-chain actions in a blockchain network. They act as bridges between the blockchain and external data sources or systems, enabling self-executing programs to interact with real-world information or execute actions that occur outside the blockchain. The self-executing program sends a request or query to the oracle, specifying the necessary information or action to be performed off-chain. This request could involve retrieving data from APIs, accessing databases, executing external systems, or any other action outside the blockchain. The oracle receives the request from the self-executing program and performs the necessary operations or accesses external resources to fulfill the requested action off-chain. This could involve interacting with external APIs, databases, sensors, or other systems.

In some embodiments, the system may select cryptographically secure digital assets (or amount thereof) based on actual availability. For example, the system may determine a first actual availability for the first resource in a first computer network. The system may determine a first cryptographically secure digital asset corresponding to the first actual availability. The system may record the first cryptographically secure digital asset in a digital log. The system may continuously monitor or periodically checks the status and availability of the resource within the computer network. This monitoring can involve network probes, status queries, or other monitoring tools to assess the resource's accessibility. Upon monitoring, the system may gather data or metrics to measure the resource's availability. It might include metrics like uptime, response time, network connectivity, or any other relevant parameters that define the resource's accessibility. Once the system determines the current availability status of the resource, it associates this verified status with a specific cryptographically secure digital asset. This asset serves as a representation or tokenization of the resource's availability. The system may employ cryptographic techniques such as hashing, encryption, digital signatures, or other secure methods to ensure the integrity, authenticity, and immutability of the digital asset associated with the resource's availability. This enhances the security and trustworthiness of the recorded information. The system may record the association between the cryptographically secure digital asset and the verified actual availability of the resource in a digital log or ledger. This log acts as a tamper-proof record of the resource's availability status over time. Each entry in the digital log is timestamped to indicate the time of recording. This helps in tracking changes, auditing the history of resource availability, and providing a chronological record of events for analysis or compliance purposes.

At step 610, process 600 (e.g., using one or more components described above) executes the blockchain action. For example, the system may execute the first blockchain action, by the first action specific self-executing program, based on determining to perform the first blockchain action, wherein executing the first blockchain action causes the first tokenized capacity of the first resource to be transferred to a second resource.

In some embodiments, the system may determine the first actual availability for the first resource in the first computer network by the system receiving a first verification that the first resource has the first actual availability and recording the first cryptographically secure digital asset as corresponding to the first resource based on the first verification. For example, the system may initiate a verification process to determine the actual availability of a specific resource (e.g., a balance in a bank account, liquidity in a bank branch, etc.) within the computer network. This verification can involve various methods, such as network monitoring, pinging the resource, querying its status, or using specific protocols to confirm its accessibility. Upon verification, the system receives a confirmation or verification signal indicating the current status or availability level of the resource. This signal signifies that the resource is accessible and operational at that particular moment, confirming its actual availability. Following the verification and confirmation of the resource's availability, the system records or associates this verified status with a cryptographically secure digital asset. This association establishes a link or correlation between the verified actual availability of the resource and a unique digital asset stored or represented on the network. The system ensures that the digital asset linked to the resource's availability is cryptographically secure. This involves employing encryption, hashing, or other cryptographic techniques to safeguard the asset's integrity and authenticity within the system. The system maintains a record or ledger where the association between the verified actual availability and the corresponding cryptographically secure digital asset is stored securely. This record serves as a reference point for the resource's status and can be accessed for verification or auditing purposes. As the availability status of the resource changes over time (due to network conditions, maintenance, transactions, liquidity changes, etc.), the system may dynamically update or revise the association with the corresponding digital asset to reflect the most current and verified availability status accurately.

In some embodiments, the first verification may be determined based on an amount for an off-chain record corresponding to the first resource, and the first verification may be received at a first blockchain network via a first oracle. For example, the system may interact with an oracle that has access to off-chain data, such as databases, APIs, or external systems, where the off-chain record corresponding to a specific resource is stored or updated. The system may define conditions or rules specifying that an on-chain action should occur based on certain parameters or data retrieved from the off-chain record. For instance, the condition could be a specific amount or value associated with the resource in the off-chain record. The system may use the oracle to query the off-chain data source and retrieve the relevant information or amount corresponding to the resource. The oracle fetches this data from the off-chain record. Upon receiving the data from the off-chain source, the system may validate and compare it against the predefined conditions or rules set for triggering the on-chain action. If the retrieved amount matches or meets the specified criteria, the validation process confirms that the condition is satisfied. Once the validation confirms that the condition based on the off-chain record's data is met (e.g., a party delivers a good at issue in a transaction, a party paid for a good, a network connection is created, appropriate availability/liquidity is found, etc.), the system triggers the corresponding on-chain action or smart contract function. This action could involve initiating a transaction, updating a smart contract state, executing a programmatic function, or performing any predefined action on the blockchain. The verified on-chain action is broadcasted to the blockchain network for execution and inclusion in a block. Miners or validators on the blockchain network process and validate the transaction, ensuring its inclusion in the distributed ledger. After the transaction is confirmed and added to the blockchain, the on-chain action corresponding to the validated off-chain data is executed, thereby reflecting the updated state or result on the blockchain.

In some embodiments, executing the first blockchain action based on determining to perform the first blockchain action may comprise the system recording the first cryptographically secure digital asset in a digital log for the second resource. The system may determine a second actual availability for the second resource based on the first cryptographically secure digital asset. The system may transmit a second verification that the second resource has the second actual availability.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

Figure 7:
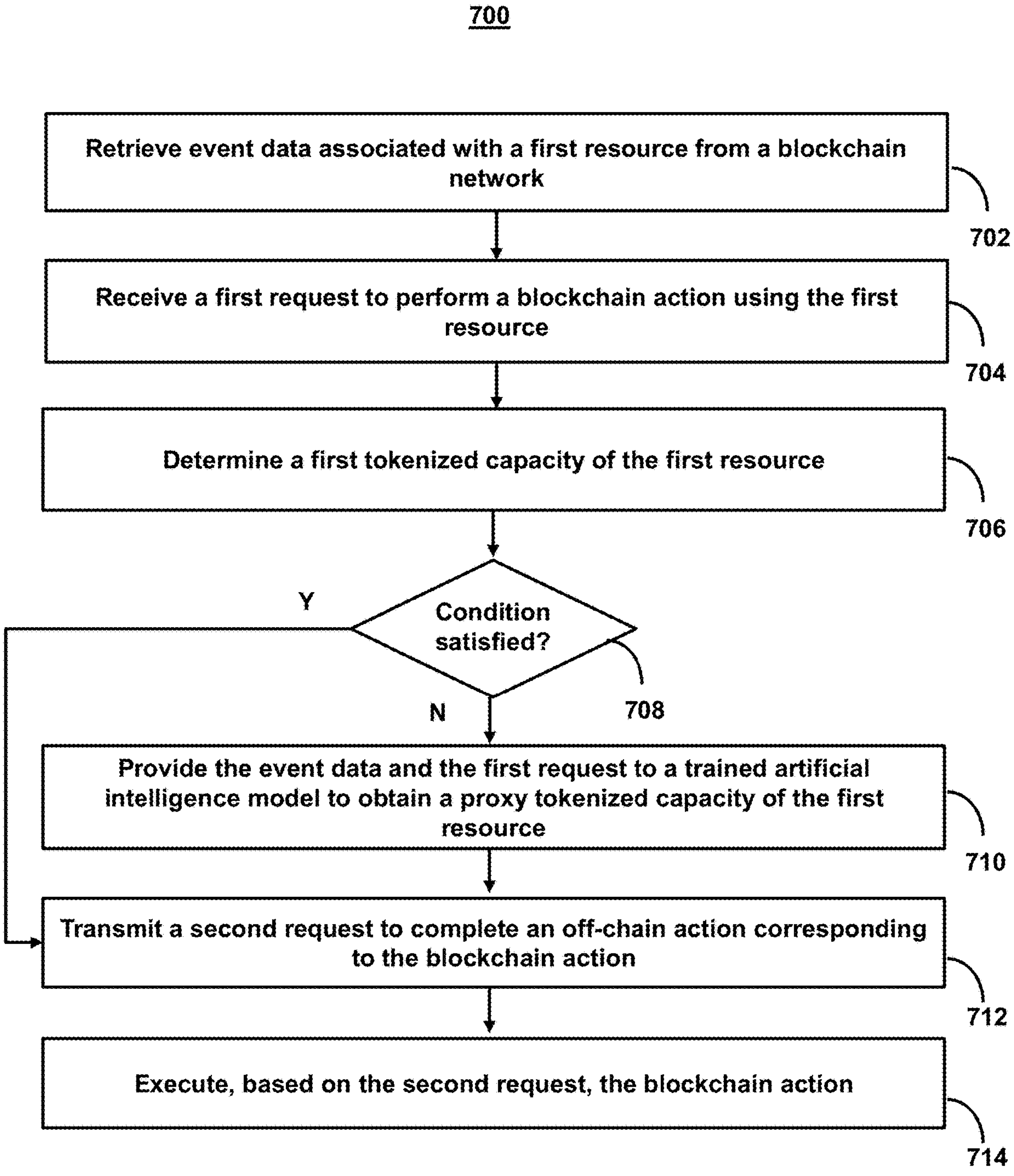
FIG. 7 shows a flowchart of the steps involved in determining availability of resources across global or cloud computer networks leveraging one or more machine learning models, in accordance with one or more embodiments.

FIG. 7 shows a flowchart of the steps involved in determining availability of resources across global or cloud computer networks leveraging one or more machine learning models, in accordance with one or more embodiments. For example, the system (e.g., system 400) may use process 700 (e.g., as implemented on one or more system components described above) in order to determine availability of resources across global or cloud computer networks while mitigating issues related to providing services with unstable resources by leveraging one or more artificial intelligence models.

At step 702, process 700 (e.g., using one or more components described above) includes retrieving event data associated with a first resource from a blockchain network. The event data may represent a sequence of events associated with a first resource (e.g., first resource 102). In some examples, the first resource may be from a blockchain network (e.g., network 110 of FIGS. 4A-4C). Each event included in the sequence of events may correspond to a blockchain action. Each event included in the sequence of events may include a tokenized capacity of the first resource to perform the blockchain action.

In some embodiments, each event of the sequence of events is stored and represented by a block on the blockchain network (e.g., network 110). For example, each event included in the sequence of events may correspond to a blockchain action. The blockchain action can be encoded in an action specific self-executing program (e.g., self-executing program 106). Each event may also include a corresponding tokenized capacity of the first resource (e.g., first resource 102) to perform the blockchain action.

At step 704, process 700 (e.g., using one or more components described above) includes receiving a first request to perform a blockchain action using the first resource. The first request may be a request to perform a blockchain action. In particular, the blockchain action may be requested to be performed using the first resource. The blockchain action may be encoded using the action specific self-executing program.

At step 706, process 700 (e.g., using one or more components described above) includes determining a first tokenized capacity of the first resource. The first tokenized capacity may be determined based on the first request. In some examples, the action specific self-executing program may be configured to determine the first tokenized capacity.

At step 708, process 700 (e.g., using one or more components described above) includes determining whether a condition has been satisfied. The condition may refer to a condition to be satisfied in order to cause the blockchain action to be performed. In some examples, the condition encoded in the action specific self-executing program. If system 400 determines that the first tokenized amount satisfies the condition, then a request to complete the off-chain action corresponding to the blockchain action may be generated and transmitted. However, if system 400 determines that the first tokenized amount fails to satisfy the condition, system 400 may leverage other techniques to help facilitate execution of the blockchain action (i.e., by leveraging one or more machine learning models, as detailed below) or prevent the blockchain action.

If the condition has not been satisfied, process 700 may proceed to step 710. At step 710, process 700 (e.g., using one or more components described above) includes providing the event data and the first request to a trained artificial intelligence model to obtain a proxy tokenized capacity of the first resource. Artificial intelligence model 410 may refer to a transformer model or other artificial intelligence model. In some examples, instructions for determining whether the blockchain action satisfies the condition (or other conditions) may be stored by action specific self-executing program (e.g., self-executing program 106). In one or more embodiments, the event data and the first request may be input to the machine learning model in response to determining that the first tokenized capacity of the first resource fails to satisfy the condition.

At step 712, process 700 (e.g., using one or more components described above) includes transmitting a second request to complete an off-chain action corresponding to the blockchain action. In some embodiments, system 400 may determine whether the off-chain action was completed. If not, system 400 may continue to monitor data exchanges to detect notification of the off-chain action's completion. System 400 can monitor for a predetermined amount of time (i.e., until a timeout) after which system 400 may prevent the blockchain action from being executed. However, in response to system 400 determining that the off-chain action was completed, system 400 may be configured to execute, or cause execution of, the blockchain action. The blockchain action may be specified using the action specific self-executing program, which can encode the blockchain action. In some embodiments, execution of the blockchain action may cause system 400 to transfer, or cause the transfer of, the proxy tokenized capacity of the first resource (e.g., first resource 102) to a second resource (e.g., second resource 104).

If, at step 708, the condition has not been satisfied, process 700 may proceed to step 712.

At step 714, process 700 (e.g., using one or more components described above) includes executing, based on the second request, the blockchain action. The second off-chain action may also be encoded by action specific self-executing program (e.g., self-executing program 106). In some examples, the second off-chain action may be configured to increase the first tokenized capacity of the first resource to the proxy tokenized capacity of the first resource. In some cases, the second off-chain action may cause an additional transfer of a tokenized capacity from first resource 102 to one or more other resources (e.g., one or more entities storing resources).

In some embodiments, process 700 includes determining that the first tokenized capacity of the first resource fails to satisfy the condition. The pre-authorized tokenized capacity indicates a tokenized capacity of the first resource (e.g., first resource 102) needed to authorize execution of the blockchain action. If the first tokenized capacity of the first resource does not meet or exceed the pre-authorized tokenized capacity, then this can indicate that the first tokenized capacity of the first resource fails to satisfy the condition. In scenarios where the first tokenized capacity of the first resource is determined to not meet or exceed the pre-authorized tokenized capacity, system 400 may be configured to prevent the blockchain action from being performed. For example, system 400 may compare the pre-authorized tokenized capacity and the first tokenized capacity. If the pre-authorized tokenized capacity is less than the first tokenized capacity, then this can indicate to system 400 that the blockchain action is authorized to be performed. Alternatively, if the pre-authorized tokenized capacity is equal to or greater than the first tokenized capacity, then this can indicate to system 400 that the blockchain action is not authorized to be performed.

In some embodiments, the trained artificial intelligence model (e.g., artificial intelligence model 410) may be used to generate a representation of the event data and the first request. For example, the trained artificial intelligence model may comprise a transformer model including an encoder-decoder architecture. The event data and the first request may be provided to the encoder, which may generate an embedding representing the event data and the first request. In some examples, the first request may comprise a sequence of steps (e.g., a prompt, code, etc.) and the event data may comprise a sequence of events. A "sequence," as defined herein, refers to an ordered set of elements. For example, the sequence of letters in the English alphabet includes 26 elements (i.e., letters) in a specific order.

In some embodiments, the trained artificial intelligence model (e.g., artificial intelligence model 410) may be used to determine the proxy tokenized capacity of the first resource based on the representation. For example, representation may be provided to the decoder component of the transformer model, which can map the embedding to a candidate proxy tokenized capacity of the first resource.

In some embodiments, process 700 includes one or more steps involved in training, or causing the training of, artificial intelligence model 410. Process 700 may also include updating artificial intelligence model 410, retrain or rebuild artificial intelligence model 410, or may train, retrain, rebuild other artificial intelligence models. In some examples, the training may be performed offline prior to being used during production (i.e., post-deployment). In some examples, process 700 includes continuously monitoring the performance of artificial intelligence model 410 to determine whether artificial intelligence model 410's performance degrades over time and, if so, take the appropriate steps (e.g., re-train the model). In some cases, process 700 includes generating, retrieving, updating, refining, or performing other operations, to obtain and maintain training data to be used to train artificial intelligence model 410. The training data may be stored in training data database 404. In some examples, the training data may be stored with metadata indicating, for example, a time that the training data was created and/or updated, a model type or types that the training data can be used for, or other information.

In some embodiments, process 700 includes retrieving training data comprising a plurality of training samples associated with one or more resources from one or more blockchain networks. The training data may be retrieved from training data database 404. In some examples, each of the training samples may include a sequence of training events representing blockchain actions associated with a given resource from the resources, a training request associated with a requested blockchain action to be performed using the first resource, a training tokenized capacity of the first resource, or other information. In some cases, the training samples may not include or may mask the training tokenized capacity of the first resource.

In one or more examples, process 700 includes training the artificial intelligence model (e.g., artificial intelligence model 410) to determine proxy tokenized capacities of the first resource. The determined proxy tokenized capacities may be determined by the trained artificial intelligence model based on input data. For example, the input data may include event data associated with the resource, a submitted request (i.e., including a blockchain action to be executed), etc. The proxy tokenized capacities of the first resource may be used by system 400 to generate responses to received requests.

In some embodiments, to train the artificial intelligence model, process 700 may select a training sample from the plurality of training samples included in the training data. Using the selected training sample, process 700 includes providing the training sample to the artificial intelligence model. The artificial intelligence model may generate an embedding representing some or all of the training sample. For example, the embedding can represent the sequence of training events and the training request included by the selected training sample. Process 700 includes, using the artificial intelligence model, determining, or receiving an indication of a determined a candidate proxy tokenized capacity based on the embedding. Process 700 further includes adjusting one or more parameters (e.g., weights, biases, etc.) of the artificial intelligence model to minimize a difference between the candidate proxy tokenized capacity and the training tokenized capacity. In some embodiments, one or more optimizers (e.g., Adam optimizer) may be used to execute an optimization process to determine the adjustments to the parameters.

In some embodiments, process 700 includes executing a fine-tuning training component to fine-tune the artificial intelligence model for a particular resource (e.g., first resource 102). For example, the training data previously mentioned to train the artificial intelligence model may include training samples, and each sample may include a sequence of training events representing blockchain actions associated with a given resource from the one or more resources, a training request associated with a requested blockchain action to be performed using the first resource (e.g., first resource 102), a training tokenized capacity of the first resource, or other information. For example, process 700 may include retrieving first-resource specific training data stored by training data database 404. The first-resource specific training data may include a plurality of first-resource training samples associated with the first resource (e.g., first resource 102). For example, each first-resource training sample may include a sequence of first-resource training events representing blockchain actions associated with the first resource (e.g., first resource 102), a previously received request associated with a requested blockchain action performed using the first resource (e.g., first resource 102), and a measured tokenized capacity of the first resource (e.g., first resource 102). Process 700 includes generating a trained first-resource specific artificial intelligence model (e.g., artificial intelligence model 410) on the trained artificial intelligence model (trained using the training data including training samples associated with one or more resources as opposed to just the first resource) and the first-resource specific training data. In some embodiments, the fine-tuning training step may be performed for each resource to obtain a plurality of resource-specific trained artificial intelligence models.

In some embodiments, process 700 further includes generating updated training data comprising the first request, the blockchain action, and the proxy tokenized capacity of the first resource. The updated training data can be used to update the trained artificial intelligence model (e.g., artificial intelligence model 410). In some examples, each corresponding request, blockchain action, and proxy tokenized capacity may form a new training sample. The training data may be updated with each new training sample upon completion of the corresponding blockchain action. In some cases, multiple new training samples may be batched and used to update the artificial intelligence model.

In some embodiments, in response to receiving the first request (e.g., a request to perform a blockchain action using first resource 102) at step 704, process 700 may include a step of determine that a proxy tokenized capacity of the first resource (e.g., first resource 102) is to be used. In some examples, the determination that the proxy tokenized capacity is to be used may be based on the first request.

In some examples, determining that the proxy tokenized capacity is to be used may include providing the first request to a computing system associated with a third-party service provider. For example, the third-party service provider may be configured to provide proxy tokenized capacities of the first resource (e.g., first resource 102) based on the first request (e.g., a requesting user/client device, event data associated with a requesting account, etc.). In some examples, the first request may be a request to use a credit line of a third party (e.g., the third-party service provider). In response, the system may determine to use a proxy tokenized capacity provider by the third party. The proxy tokenized capacity may be a representation of client deposit or bank liability-in cash (1:1 value) in a tokenized database. The amount may be exchanged to fiat upon demand by client (e.g., settlement may by instantaneous). Alternatively, the proxy tokenized capacity may be based on the issuance of an instrument that represents the third party's obligation to pay in a tokenized database. This may not be a cash representation, but instead a willingness to pay when required conditions are met. The payment may also be instantaneous upon a successful request. In some embodiments, the third-party service provider may be configured to evaluate a risk score associated with the first request. For example, the risk score can indicate the liability of the client not replenishing the proxy tokenized capacity provided by the third-party service provider.

In some embodiments, process 700 may include determining whether the risk score satisfies a condition for performing the blockchain action. For example, the condition being to be satisfied at step 708 may cause one or more actions to be performed. The risk score satisfying the condition may include process 700 determining that the risk score is less than a threshold risk score. Alternatively, the risks score failing to satisfy the condition may include process 700 determining that the risk score is greater than or equal to the threshold risk score. As an example, if the risk score is greater than or equal to the threshold risk score, the third-party service provider may be prevented from providing the proxy tokenized capacity.

In some embodiments, process 700 may include a step of providing tokenized capacities of the first resource (e.g., first resource 102) to the third-party service provider. For example, in response to providing the proxy tokenized capacity, based on the condition being satisfied, process 700 may include a step of providing a predefined tokenized capacity or a tokenized capacity commensurate with the proxy tokenized capacity to the third-party service provider.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

A1. A method for determining availability of resources across global or cloud networks while mitigating issues related to providing services with unstable resources.

A2. The method of embodiment A1, further comprising: receiving a first request, at a first action specific self-executing program, to perform a first blockchain action using a first resource, wherein the first blockchain action is encoded in the first action specific self-executing program; determining, at the first action specific self-executing program, a first condition for performing the first blockchain action, wherein the first condition is encoded in the first action specific self-executing program; receiving, by the first action specific self-executing program, a first tokenized capacity of the first resource from a first blockchain network; determining, by the first action specific self-executing program, whether to perform the first blockchain action based on comparing the first condition to the first tokenized capacity; and executing the first blockchain action, by the first action specific self-executing program, based on determining to perform the first blockchain action, wherein executing the first blockchain action causes the first tokenized capacity of the first resource to be transferred to a second resource.

A3. The method of any one of embodiments A1-A2, wherein encoding the first blockchain action in the first action specific self-executing program further comprises: receiving the first resource as a first statement in the first action specific self-executing program; and receiving a first logic in the first action specific self-executing program that determines the second resource upon execution of the first action specific self-executing program.

A4. The method of any one of embodiments A1-A3, wherein encoding the first blockchain action in the first action specific self-executing program further comprises: receiving a first value for satisfying the first condition; and receiving a first time for satisfying a second condition.

A5. The method of any one of embodiments A1-A4, wherein determining whether to perform the first blockchain action is further based on: transmitting a second user request to complete a first off-chain action; and determining that the first off-chain action is completed.

A6. The method of any one of embodiments A1-A5, further comprising: determining a first actual availability for the first resource in a first computer network; determining a first cryptographically secure digital asset corresponding to the first actual availability; and recording the first cryptographically secure digital asset in a digital log.

A7. The method of embodiment A6, wherein executing the first blockchain action based on determining to perform the first blockchain action further comprises: recording the first cryptographically secure digital asset in a digital log for the second resource; determining a second actual availability for the second resource based on the first cryptographically secure digital asset; and transmitting a second verification that the second resource has the second actual availability.

A8. The method of any one of embodiments A6-A7, further comprising: determining a first characteristic of the first actual availability; and selecting the first cryptographically secure digital asset, from a plurality of cryptographically secure digital assets, based on the first characteristic.

A9. The method of any one of embodiments A6-A8, further comprising: determining a second condition for performing the first blockchain action; and selecting the first cryptographically secure digital asset, from a plurality of cryptographically secure digital assets, based on the second condition.

A10. The method of any one of embodiments A1-A9, wherein determining the first condition comprises determining a first requirement for a first cryptographically secure digital asset as recorded in a predetermined digital log corresponding to the first resource.

A11. The method of any one of embodiments A1-A10, wherein determining whether to perform the first blockchain action is further based on: comparing the first condition to the first tokenized capacity; determining a first actual availability for a first resource in a first computer network based on the first tokenized capacity; and determining that the first condition corresponds to the first actual availability.

A12. The method of embodiment A11, wherein determining the first actual availability for the first resource in the first computer network further comprises: receiving a first verification that the first resource has the first actual availability; and recording a first cryptographically secure digital asset as corresponding to the first resource based on the first verification.

A13. The method of embodiment A12, wherein the first verification is determined based on an amount for an off-chain record corresponding to the first resource, and wherein the first verification is received at the first blockchain network via a first oracle.

A14. The method of any one of embodiments A1-A13, wherein receiving the first request further comprises: receiving, at a platform management application, a user request to perform a first off-chain action; and determining that the first blockchain action corresponds to first off-chain action.

A15. The method of any one of embodiments A1-A14, wherein receiving the first request further comprises: receiving a first user request to perform a first off-chain action; and determining that the first blockchain action corresponds to the second resource.

B1. A method for providing on-demand access to resources across global or cloud computer networks by using transformer models to estimate proxy resource capacities and leveraging the proxy resource capacities to enable on-demand access to the resources.

B2. The method of embodiment B1, further comprising: retrieving event data representing a sequence of events associated with a first resource from a blockchain network; receiving, using an action specific self-executing program, a first request to perform a blockchain action using the first resource; determining, using the action specific self-executing program, based on the first request, that a first tokenized capacity of the first resource from the blockchain network fails to satisfy a condition for performing the blockchain action; providing, using the action specific self-executing program, the event data and the first request to a trained artificial intelligence model to obtain a proxy tokenized capacity of the first resource; transmitting, using the action specific self-executing program, a second request to complete an off-chain action corresponding to the blockchain action based on the proxy tokenized capacity of the first resource satisfying the condition for performing the blockchain action; and executing, using the action specific self-executing program, based on the second request, the blockchain action to cause the proxy tokenized capacity of the first resource to be transferred to a second resource.

B3. The method of any one of embodiments B1-B2, wherein each event of the sequence of events is stored and represented by a block on the blockchain network.

B4. The method of any one of embodiments B1-B3, further comprising: retrieving training data comprising a plurality of training samples associated with one or more resources from one or more blockchain networks, wherein each of the plurality of training samples includes (i) a sequence of training events representing blockchain actions associated with a given resource from the one or more resources, (ii) a training request associated with a requested blockchain action to be performed using the first resource, and (iii) a training tokenized capacity of the first resource; and training, based on the training data, an artificial intelligence model to obtain the trained artificial intelligence model.

B5. The method of embodiment B4, wherein the trained artificial intelligence model determines proxy tokenized capacities of the first resource to generate as responses to received requests.

B6. The method of any one of embodiments B4-B5, wherein training the artificial intelligence model comprises: for each training sample: generating, using the artificial intelligence model, an embedding representing (i) the sequence of training events and, (ii) the training request; determining, using the artificial intelligence model, based on the embedding, a candidate proxy tokenized capacity; and adjusting one or more parameters of the artificial intelligence model to minimize a difference between the candidate proxy tokenized capacity and the training tokenized capacity.

B7. The method of embodiment B6, further comprising: retrieving first-resource specific training data comprising a plurality of first-resource training samples associated with the first resource, wherein each of the plurality of first-resource training samples includes (i) a sequence of first-resource training events representing blockchain actions associated with the first resource, (ii) a previously-received request associated with a requested blockchain action performed using the first resource, and (iii) a measured tokenized capacity of the first resource; and generating, based on the trained artificial intelligence model and the first-resource specific training data, a trained first-resource specific artificial intelligence model.

B8. The method of any one of embodiments B1-B7, wherein determining that the first tokenized capacity of the first resource fails to satisfy the condition comprises: determining a pre-authorized tokenized capacity for performing the blockchain action; and preventing the blockchain action from being performed based on a comparison of the pre-authorized tokenized capacity and the first tokenized capacity.

B9. The method of any one of embodiments B1-B8, wherein providing the event data and the first request to the trained artificial intelligence model comprises: generating, using the trained artificial intelligence model, a representation of the event data and the first request; and determining, using the trained artificial intelligence model, the proxy tokenized capacity of the first resource based on the representation.

B10. The method of any one of embodiments B1-B9, wherein each event included in the sequence of events (i) corresponds to a blockchain action encoded in an action specific self-executing program, and (ii) comprises a corresponding tokenized capacity of the first resource to perform the blockchain action.

B11. The method of any one of embodiments B1-B10, further comprising: providing the first request to one or more machine learning models trained to extract blockchain action data related to the blockchain action; and classifying, using the one or more machine learning models, the first request into a first request class associated with off-chain actions based on the extracted blockchain action data.

B12. The method of embodiment B11, wherein the blockchain action corresponds to an off-chain action based on the first request being classified into the first request class.

B13. The method of any one of embodiments B11-B12, wherein the one or more machine learning models include a natural language processing (NLP) model trained to identify one or more keywords within the first request and map the one or more identified keywords to one or more first request class keywords.

B14. The method of any one of embodiments B1-B13, wherein the trained artificial intelligence model comprises a first artificial intelligence model, the method further comprises: generating, using a second artificial intelligence model, a set of instructions to execute the off-chain action, wherein the second request comprises the set of instructions.

B15. The method of any one of embodiments B1-B14, wherein the trained artificial intelligence model comprises a first trained artificial intelligence model, the method further comprises: generating, using a second trained artificial intelligence model, a set of instructions to effectuate transfer of the proxy tokenized capacity to the second resource; and receiving a message indicating that the transfer of the proxy tokenized capacity has been executed in accordance with the set of instructions.

B16. The method of embodiment B15, wherein the set of instructions comprises an instruction to execute a second off-chain action to increase the first tokenized capacity of the first resource to the proxy tokenized capacity of the first resource.

B17. The method of any one of embodiments B1-B16, further comprising: generating updated training data comprising the first request, the blockchain action, and the proxy tokenized capacity of the first resource, wherein the updated training data is used to update the trained artificial intelligence model.

B18. The method of any one of embodiments B1-B17, wherein the trained artificial intelligence model comprises a first trained artificial intelligence model, the method further comprises: generating, using a second trained artificial intelligence model, the action specific self-executing program based on one or more rules associated with at least one of the first resource or the second resource.

B19. The method of embodiment B18, wherein generating the action specific self-executing program comprises: encoding the one or more rules in the action specific self-executing program, wherein the one or more rules comprise the blockchain action and the condition.

B20. The method of any one of embodiments B1-B19, wherein the tokenized capacity of the first resource from the blockchain network is determined to fail to satisfy the condition for performing the blockchain action responsive to receiving the first request to perform the blockchain action using the first resource.

B21. The method of any one of embodiments B1-B20, wherein the second request is transmitted to complete the off-chain action responsive to determining that the proxy tokenized capacity of the first resource satisfies the condition.

B22. The method of any one of embodiments B1-B21, wherein the blockchain action is executed to cause the proxy tokenized capacity of the first resource to be transferred to a second resource responsive to determining that the proxy tokenized capacity of the first resource satisfies the condition.

B23. The method of embodiment B1, comprising: retrieving event data representing a sequence of events associated with a first resource from a first blockchain network, wherein each event included in the sequence of events (i) corresponds to a blockchain action encoded in an action specific self-executing program, and (ii) comprises a tokenized capacity of the first resource to perform the blockchain action, and wherein the blockchain action corresponds to an off-chain action; receiving a first request, using the action specific self-executing program, to perform a first blockchain action using the first resource, wherein the first blockchain action is encoded in the action specific self-executing program; determining, using the action specific self-executing program, a first tokenized capacity of the first resource from the first blockchain network based on the first request; determining, using the action specific self-executing program, that the first tokenized capacity of the first resource fails to satisfy a condition for performing the first blockchain action, wherein the condition is encoded in the action specific self-executing program; inputting, using the action specific self-executing program, the event data and the first request to a trained transformer model to obtain a proxy tokenized capacity of the first resource; responsive to determining that the proxy tokenized capacity of the first resource satisfies the condition for performing the first blockchain action, transmitting a second request to complete the off-chain action; responsive to determining that the off-chain action was completed, executing the first blockchain action, using the action specific self-executing program, to cause the proxy tokenized capacity of the first resource to be transferred to a second resource; and generating, using the action specific self-executing program, an instruction to execute a second off-chain action to increase the first tokenized capacity of the first resource to the proxy tokenized capacity of the first resource.

B24. The method of embodiment B1, comprising: retrieving event data representing a sequence of events associated with a first resource from a blockchain network; responsive to receiving a first request to perform a blockchain action using the first resource, determining, based on the first request, that a tokenized capacity of the first resource from the blockchain network fails to satisfy a condition for performing the blockchain action; providing the event data and the first request to a trained artificial intelligence model to obtain a proxy tokenized capacity of the first resource; responsive to determining that the proxy tokenized capacity of the first resource satisfies the condition: transmitting a second request to complete an off-chain action corresponding to the blockchain action; and executing, based on the second request, the blockchain action to cause the proxy tokenized capacity of the first resource to be transferred to a second resource.

B25. A method, comprising: retrieving event data representing a sequence of events associated with a first resource from a blockchain network; responsive to receiving a first request to perform a blockchain action using the first resource, determining to use a proxy tokenized capacity based on the first request; responsive to determining that the proxy tokenized capacity of the first resource satisfies a condition for performing the blockchain action: transmitting a second request to complete an off-chain action corresponding to the blockchain action; and executing, based on the second request, the blockchain action to cause the proxy tokenized capacity of the first resource to be transferred to a second resource.

C1. One or more non-transitory computer-readable media storing computer program instructions that, when executed by one or more processors, effectuate operations comprising those of any of embodiments A1-A15 or B1-B25.

C2. A system comprising one or more processors; and memory storing instructions that, when executed by the processors, cause the processors to effectuate operations comprising those of any of embodiments A1-A15 or B1-B25.

C3. A system comprising means for performing any of embodiments A1-A15 or B1-B25.

What is claimed is:

1. A method implemented using one or more processors of a computing system, the method comprising:

retrieving event data representing a sequence of events associated with a first resource from a blockchain network;

responsive to receiving a first request to perform a blockchain action using the first resource, determining, using an artificial intelligence model, a proxy tokenized capacity based on a representation of the event data and the first request, wherein the artificial intelligence model is generated by:

generating, for a plurality of training samples, a respective embedding representing (i) a respective sequence of training events, and (ii) a respective training request;

determining, based on the respective embedding, a respective candidate proxy tokenized capacity; and adjusting one or more parameters of the artificial intelligence model to minimize a difference between the respective candidate proxy tokenized capacity and a respective training tokenized capacity;

responsive to determining that the proxy tokenized capacity of the first resource satisfies a condition for performing the blockchain action:

transmitting a second request to complete an off-chain action corresponding to the blockchain action; and executing, based on the second request, the blockchain action to cause the proxy tokenized capacity of the first resource to be transferred to a second resource.

2. The method of claim 1, wherein each event of the sequence of events is stored and represented by a block on the blockchain network.

3. The method of claim 1, wherein each event included in the sequence of events (i) corresponds to a respective blockchain action encoded in an action specific self-executing program, and (ii) comprises a corresponding tokenized capacity of the first resource to perform the blockchain action.

4. The method of claim 1, wherein the artificial intelligence model determines proxy tokenized capacities of the first resource to generate as responses to received requests.

5. The method of claim 1, further comprising:

retrieving first-resource specific training data comprising a plurality of first- resource training samples associated with the first resource, wherein each of the plurality of first-resource training samples includes (i) a sequence of first-resource training events representing blockchain actions associated with the first resource, (ii) a previously-received request associated with a requested blockchain action performed using the first resource, and (iii) a measured tokenized capacity of the first resource; and generating, based on the trained artificial intelligence model and the first-resource specific training data, a trained first-resource specific artificial intelligence model.

6. The method of claim 1, further comprising:

determining that a first tokenized capacity of the first resource fails to satisfy the condition by:

determining a pre-authorized tokenized capacity for performing the blockchain action; and preventing the blockchain action from being performed based on a comparison of the pre-authorized tokenized capacity and the first tokenized capacity.

7. The method of claim 1, wherein each event included in the sequence of events (i) corresponds to a respective blockchain action encoded in an action specific self-executing program, and (ii) comprises a corresponding tokenized capacity of the first resource to perform the blockchain action.

8. The method of claim 1, wherein the artificial intelligence model comprises a first artificial intelligence model, and wherein the method further comprises:

generating, using a second artificial intelligence model, a set of instructions to execute the off-chain action, wherein the second request comprises the set of instructions.

9. The method of claim 1, further comprising:

generating updated training data comprising the first request, the blockchain action, and the proxy tokenized capacity of the first resource, wherein the updated training data is used to update the artificial intelligence model.

10. The method of claim 1, further comprising:

providing the first request to one or more machine learning models trained to extract blockchain action data related to the blockchain action; and classifying, using the one or more machine learning models, the first request into a first request class associated with off-chain actions based on extracted blockchain action data.

11. The method of claim 10, wherein the blockchain action corresponds to the off-chain action based on the first request being classified into the first request class.

12. The method of claim 10, wherein the one or more machine learning models include a natural language processing (NLP) model trained to identify one or more keywords within the first request and map the one or more keywords to one or more first request class keywords.

13. The method of claim 1, wherein the artificial intelligence model comprises a first artificial intelligence model, and wherein the method further comprises:

generating, using a second artificial intelligence model, a set of instructions to effectuate transfer of the proxy tokenized capacity to the second resource; and receiving a message indicating that the transfer of the proxy tokenized capacity has been executed in accordance with the set of instructions.

14. The method of claim 13, wherein the set of instructions comprises an instruction to execute a second off-chain action to increase a first tokenized capacity of the first resource to the proxy tokenized capacity of the first resource.

15. The method of claim 1, wherein the artificial intelligence model comprises a first artificial intelligence model, and wherein the method further comprises:

generating, using a second artificial intelligence model, an action specific self-executing program based on one or more rules associated with at least one of the first resource or the second resource.

16. The method of claim 15, wherein generating the action specific self-executing program comprises:

encoding the one or more rules in the action specific self-executing program, wherein the one or more rules comprise the blockchain action and the condition.

17. One or more non-transitory, computer-readable media comprising instructions recorded thereon that when executed by one or more processors cause operations comprising:

retrieving event data representing a sequence of events associated with a first resource from a blockchain network;

responsive to receiving a first request to perform a blockchain action using the first resource, determining, using an artificial intelligence model, a proxy tokenized capacity based on a representation of the event data and the first request, wherein the artificial intelligence model is generated by:

generating, for a plurality of training samples, a respective embedding representing (i) a respective sequence of training events, and (ii) a respective training request;

determining, based on the respective embedding, a respective candidate proxy tokenized capacity; and adjusting one or more parameters of the artificial intelligence model to minimize a difference between the respective candidate proxy tokenized capacity and a respective training tokenized capacity;

responsive to determining that the proxy tokenized capacity of the first resource satisfies a condition for performing the blockchain action:

transmitting a second request to complete an off-chain action corresponding to the blockchain action; and executing, based on the second request, the blockchain action to cause the proxy tokenized capacity of the first resource to be transferred to a second resource.

18. The one or more non-transitory, computer-readable media of claim 17, wherein each event included in the sequence of events (i) corresponds to a respective blockchain action encoded in a respective action specific self-executing program, and (ii) comprises a corresponding tokenized capacity of the first resource to perform the blockchain action.

19. A system for providing on-demand access to resources across global or cloud computer networks by using artificial intelligence models to estimate proxy resource capacities and leveraging the proxy resource capacities to enable on-demand access to the resources, the system comprising:

one or more processors; and one or more non-transitory, computer-readable media storing instructions that when executed by the one or more processors cause operations comprising:

retrieving event data representing a sequence of events associated with a first resource from a blockchain network;

responsive to receiving a first request to perform a blockchain action using the first resource, determining, using an artificial intelligence model, a proxy tokenized capacity based on a representation of the event data and the first request, wherein the artificial intelligence model is generated by:

generating, for a plurality of training samples, a respective embedding representing (i) a respective sequence of training events, and (ii) a respective training request;

determining, based on the respective embedding, a respective candidate proxy tokenized capacity; and adjusting one or more parameters of the artificial intelligence model to minimize a difference between the respective candidate proxy tokenized capacity and a respective training tokenized capacity;

responsive to determining that the proxy tokenized capacity of the first resource satisfies a condition for performing the blockchain action:

transmitting a second request to complete an off-chain action corresponding to the blockchain action; and executing, based on the second request, the blockchain action to cause the proxy tokenized capacity of the first resource to be transferred to a second resource.

* * * * *